United States Patent
Yamabana et al.

(10) Patent No.: US 11,309,971 B2
(45) Date of Patent: Apr. 19, 2022

(54) CONTROLLER AND CONTROL METHOD

(71) Applicant: Fujitsu Optical Components Limited, Kawasaki (JP)

(72) Inventors: Tetsuji Yamabana, Kawasaki (JP); Tsuyoshi Morishita, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/135,593

(22) Filed: Dec. 28, 2020

(65) Prior Publication Data

US 2021/0250099 A1 Aug. 12, 2021

(30) Foreign Application Priority Data

Feb. 7, 2020 (JP) .................. JP2020-19439

(51) Int. Cl.
*H04B 10/50* (2013.01)
*H04B 10/556* (2013.01)
*H04B 10/564* (2013.01)

(52) U.S. Cl.
CPC ... *H04B 10/50575* (2013.01); *H04B 10/5561* (2013.01); *H04B 10/564* (2013.01)

(58) Field of Classification Search
CPC ........ H04B 10/07955; H04B 10/50575; H04B 10/5561; H04B 10/564
See application file for complete search history.

(56) References Cited

U.S. PATENT DOCUMENTS

| 6,483,095 | B1 * | 11/2002 | Iwaki ..................... G07D 7/12 |
| | | | 250/214 R |
| 9,686,017 | B2 | 6/2017 | Yamanaka et al. |
| 2003/0095736 | A1 * | 5/2003 | Kish, Jr. ............... B82Y 20/00 |
| | | | 385/14 |
| 2015/0188639 | A1 * | 7/2015 | Akashi ............ H04B 10/50575 |
| | | | 398/197 |
| 2016/0156418 | A1 * | 6/2016 | Yamanaka ......... H04B 10/5561 |
| | | | 398/38 |

FOREIGN PATENT DOCUMENTS

JP 2016-111398 6/2016

* cited by examiner

*Primary Examiner* — Dzung D Tran
(74) *Attorney, Agent, or Firm* — Staas & Halsey LLP

(57) ABSTRACT

Controller and control method are provided. In particular, a controller is disclosed as being configured to hold intensities of a monitor signal, which changes according to an output from a region in a device, before and after altering a state of a portion in the region and control the state of the portion based on a difference between the held intensities.

5 Claims, 18 Drawing Sheets

CONTROLLER AND CONTROL METHOD

CROSS-REFERENCE TO RELATED APPLICATION

This application is based upon and claims the benefit of priority of the prior Japanese Patent Application No. 2020-19439, filed on Feb. 7, 2020, the entire contents of which are incorporated herein by reference.

FIELD

The embodiments discussed herein are related to a controller and a control method.

BACKGROUND

Devices (e.g., Mach-Zehnder modulators) are used while their biases are controlled, the devices changing their outputs according the biases. Control of the bias is performed based on response to the bias on which a sine wave (so-called a dither signal) is superimposed, the response being that of the device, and the sine wave being lower in frequency and smaller in amplitude than an input signal. This technique extracts a signal (hereinafter, referred to as a dither component) oscillating at the same frequency as the dither signal from the output of the device and controls the bias based on the extracted dither component. The dither component is extracted with a bandpass filter.

In order to reduce a size of the circuit for bias control, some techniques are proposed (e.g., Japanese Laid-open Patent Publication No. 2016-111398 and U.S. Pat. No. 9,686,017) in which the bias control is performed on the basis of response to a bias on which a square wave is superimposed instead of a sine wave. This technique extracts a signal oscillating at the same frequency as the square wave from the output of the device and controls the bias on the basis of the extracted signal. For the extracting of a signal oscillating at the same frequency as the square wave, many circuits such as analog-to-digital conversion circuits, digital-to-analog conversion circuits, and a switch circuits are used.

SUMMARY

According to an aspect of the embodiments, a controller for controlling a device in which an output from a region thereof including a first portion changes according to a first state of the first portion, the controller including: a first hold unit that performs first sample-and-hold processing that includes changing a first output thereof according to an intensity of a monitor signal inputted thereto and thereafter holding the changed first output, the monitor signal changing according to the output; a second hold unit that performs second sample-and-hold processing that includes changing a second output thereof according to an intensity of the monitor signal inputted thereto and thereafter holding the changed second output, the second hold unit differing from the first hold unit; and a control unit that causes the first hold unit to perform the first sample-and-hold processing while holding the first state of the first portion constant and alters the first state of the first portion after the first sample-and-hold processing, then causes the second hold unit to perform the second sample-and-hold processing while holding the altered first state of the first portion, and furthermore controls the first state of the first portion based on a difference between an intensity of the first output held by the first hold unit and an intensity of the second output held by the second hold unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As described previously, the dither component is extracted with a bandpass filter.

A capacitor included in a bandpass filter is a device that is difficult to be downsized. It is thus difficult to downsize a bandpass filter used to extract a dither component. In contrast, technological innovation (e.g., silicon photonics) has made it possible to downsize devices (e.g., Mach-Zehnder modulators) on which bias control is performed.

Consequently, bias controllers that use dither signals have become greater than devices to be controlled. In addition, devices manufactured by silicon photonics are slow to respond to bias changes, and this has increased the sizes of capacitors in bandpass filters that extract dither signals from these devices.

Japanese Laid-open Patent Publication No. 2016-111398 and U.S. Pat. No. 9,686,017 proposes techniques to downsize bias control circuits. However, the techniques of Japanese Laid-open Patent Publication No. 2016-111398 and U.S. Pat. No. 9,686,017 use many devices such as analog-to-digital conversion circuits, and therefore fail to downsize the bias control circuits sufficiently. Following embodiments solve these problems.

Preferred embodiments will be explained with reference to accompanying drawings. Here, identical symbols are given to corresponding parts even in different drawings, and the description thereof will be omitted.

First Embodiment (1) Structure

Figure 1:
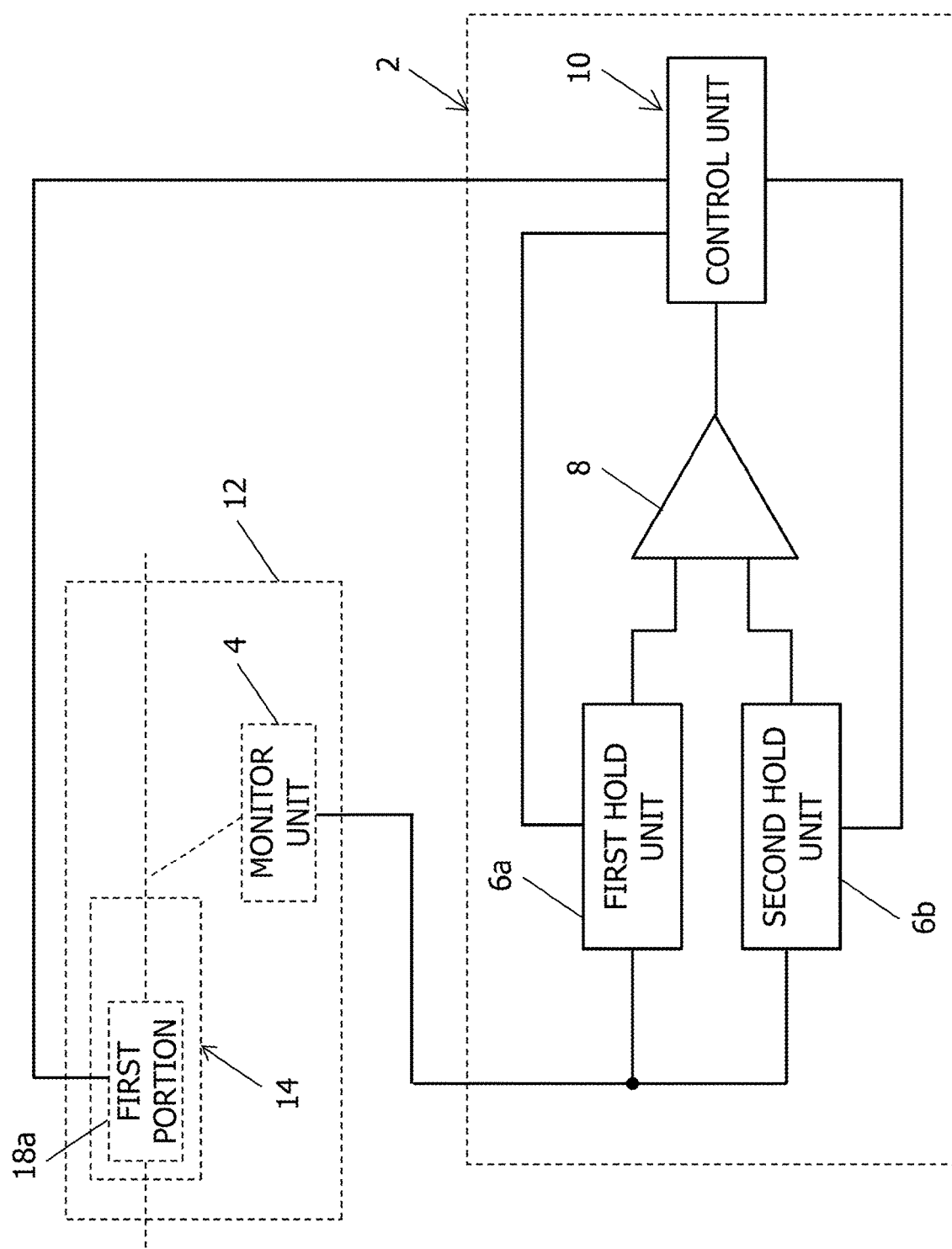
FIG. 1 is an example of a functional block diagram of a controller 2 of the first embodiment.

FIG. 1 is an example of a functional block diagram of a controller 2 of the first embodiment.

As illustrated in FIG. 1, the controller 2 of the first embodiment includes a first hold unit 6a, a second hold unit 6b, a differential unit 8, and a control unit 10. The first and second hold units 6a and 6b may be sample-and-hold circuits. In other words, the first and second hold units 6a and 6b are realized with sample-and-hold circuits for example (the same applies to other units). The control unit 10 may be an integrated circuit.

FIG. 1 also depicts a device 12 controlled by the controller 2. The device 12 has a region 14 (hereinafter referred to as a controlled region) that may include a Mach-Zehnder modulator. The device 12 also includes a monitor unit 4, which may be a photodiode and a resistor.

(2) Operation

Figure 2:
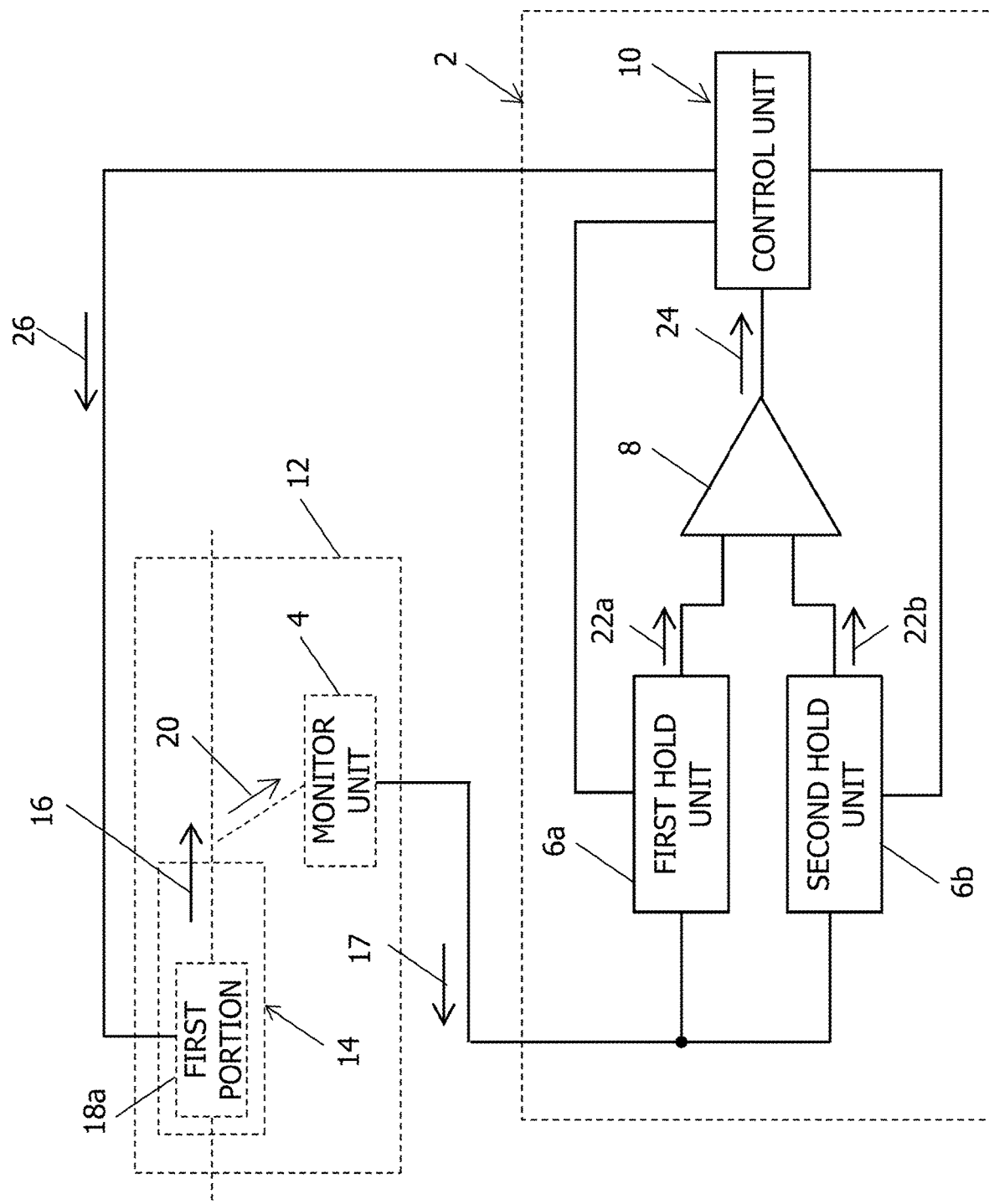
FIG. 2 is a diagram illustrating the operation of the controller 2.

FIG. 2 is a diagram illustrating the operation of the controller 2.

The controlled region 14 of the device 12 includes a first portion 18a. The intensity of an output 16 from the controlled region 14 (hereinafter referred to as a controlled variable) changes according to the state of the first portion 18a. The state of the first portion 18a may be referred to as a first state. The first portion 18a may be a heater (e.g., a thin film heater) arranged adjacent to an optical waveguide, or an arm, of the Mach-Zehnder modulator. The state of the first portion 18a may be a state that can be quantified in terms of a physical amount of the first portion 18a, e.g., temperature, carrier density, electric field, position, or size. The same applies to the state of the second portion, which is described in the second embodiment. The state of the second portion 18b may be referred to as a second state.

For instance, when the first portion 18a is a heater, the "state of the first portion" may be the state of the heater heated to 100° C. or the state of the heater heated to 120° C.

The device 12 may output the output 16 of the controlled region 14 as it is. Alternatively, the device 12 may manipulate (e.g., modulate, combine, or split) the output 16 of the controlled region 14 before outputting.

The monitor unit 4 generates a monitor signal 17, which changes according to the intensity of the output 16 of the controlled region 14 (i.e., the controlled variable). The monitor unit 4 may generate a monitor signal 17 from a split light 20, which is split from the output 16 of the controlled region 14. The monitor signal 17 is inputted to the first and second hold units 6a and 6b.

The monitor signal 17 may be generated by a circuit other than the monitor unit 4. For instance, a circuit, e.g., a current-voltage conversion circuit, in the controller 2 may generate a monitor signal 17 from the output of a photodetector to which the split light 20 is inputted (i.e., photocurrent).

The first hold unit 6a performs processing that includes changing its output 22a (hereinafter referred to as a first output) according to the intensity of the monitor signal 17 inputted thereto and then holding the intensity of the changed first output 22a (hereinafter referred to as first sample-and-hold processing). The second hold unit 6b performs processing that includes changing its output 22b (hereinafter referred to as a second output) according to the intensity of the monitor signal 17 inputted thereto and then holding the intensity of the changed second output 22b (hereinafter referred to as second sample-and-hold processing).

The differential unit 8 changes its output 24 according to the difference between the intensity of the first output 22a held by the first hold unit 6a and the intensity of the second output 22b held by the second hold unit 6b. That is, the output 24 of the differential unit 8 (hereinafter referred to as a differential output) changes according to the difference between the intensity of the first output 22a and the intensity of the second output 22b.

The control unit 10 causes the first hold unit 6a to perform the first sample-and-hold processing while holding the state of the first portion 18a at a constant state (e.g., the state of a temperature T1), and then alters the state of the first portion 18a to a different state (e.g., the state of a temperature T2 (≠T1)). The control unit 10 then causes the second hold unit 6b to perform the second sample-and-hold processing while holding the altered state of the first portion 18a at the above different state.

The control unit 10 then controls the state of the first portion 18a (e.g., the temperature) based on the differential output 24 of the differential unit 8. For instance, when the absolute value of the differential output 24 is greater than a permissible value, the temperature of the first portion 18a is increased or decreased depending on the sign of the differential output 24.

The control unit 10 repeats a series of above processes so that the average value for the intensities of the output 16 of the controlled region 14 approaches a target value for the output 16.

When the first portion 18a is a heater as described above, the refractive index of the arm in the Mach-Zehnder modulator changes according to the temperature of the heater because the arm is heated by the heater. The output of the Mach-Zehnder modulator (i.e., the output 16 of the controlled region 14) therefore changes according to the temperature of the heater (i.e., the state of the first portion 18a). The temperature of the heater may be adjusted by adjusting the electric power supplied to the heater.

The control unit 10 controls the state of the first portion 18a of the device 12 with an output 26 of the control unit 10 (hereinafter referred to as a bias). The control unit 10 may adjust the electric amount (e.g., electric power, current, or voltage) of the bias 26 to control the physical amount representing the state of the first portion 18a (e.g., temperature, carrier density, electric field, position, or size), the bias 26 being applied to the first portion 18a. The same applies to a bias 226b that is applied to a second portion 18b described below.

The target value for the output 16 of the controlled region 14 may be the intensity of the output 16 at null point (that is, the minimum value of the output 16). However, the target value is not limited to the intensity of the output 16 at null point. The target may be the intensity of the output 16 at peak point or quadrature point.

The monitor signal 17 may be an analog signal (e.g., voltage or current). The same applies to the first, second, and differential outputs 22a, 22b, and 24.

Figure 3:
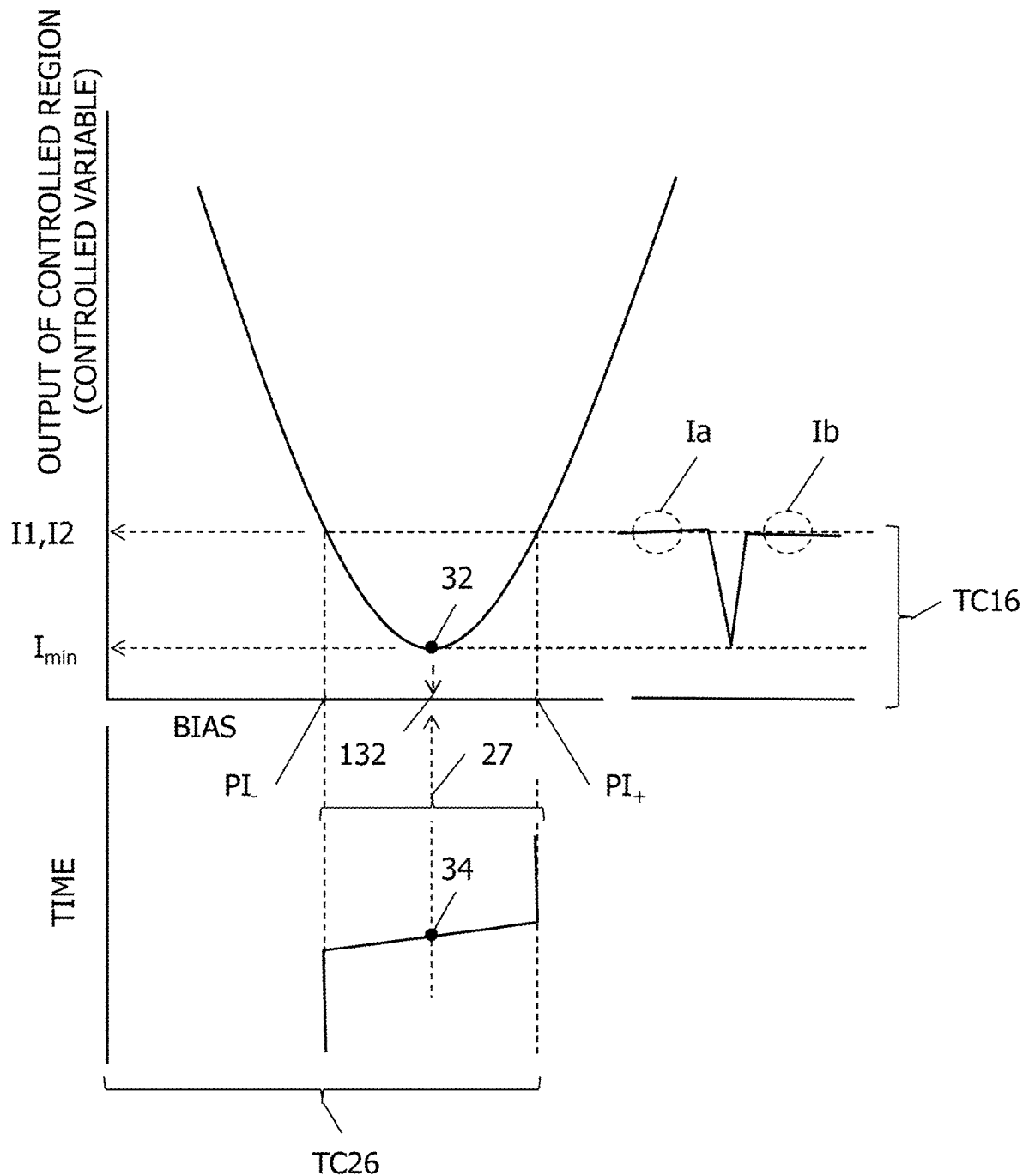
FIGS. 3 and 4 illustrate an example of control processing by the control unit 10.
Figure 4:
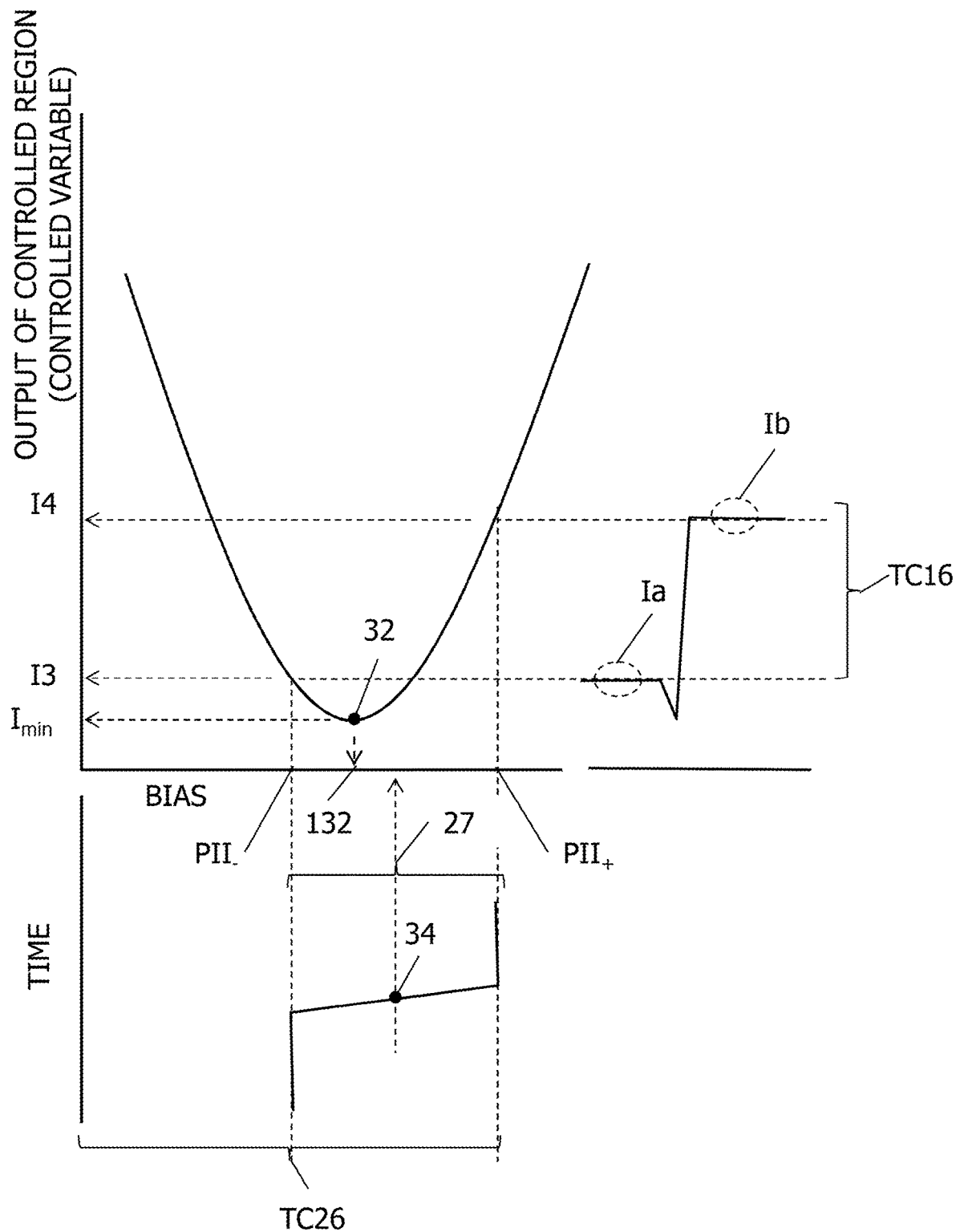

FIGS. 3 and 4 illustrate an example of control processing by the control unit 10. The vertical axis represents the intensity of the output 16 of the controlled region 14 (i.e., the controlled variable). The horizontal axis represents the intensity of the bias 26. The same applies to the vertical and horizontal axes in FIGS. 5 and 6. FIGS. 3 and 4 illustrate an example in which a Mach-Zehnder modulator generates an output 16. The output 16 thus changes periodically, but FIGS. 3 and 4 illustrate only a range around a null point 32.

The lower part of FIG. 3 illustrates the temporal change TC26 of the bias 26 (hereinafter referred to as the bias temporal change). A vertical position represents time. Time proceeds from bottom to top. A horizontal position represents the intensity of the bias 26. The same applies to the time courses illustrated in the lower parts of FIGS. 4 to 6.

The right part of FIG. 3 illustrates the temporal change TC16 of the output 16 of the controlled region 14. A horizontal position indicates time. Time proceeds from left to right. The same applies to the time courses illustrated in the right parts of FIGS. 4 to 6.

FIG. 3 illustrates an example in which the center 34 of a square wave portion 27 of the bias temporal change TC26 is approximately equal to the bias value 132 at the null point 32. The control unit 10 first causes the first hold unit 6a to perform the first sample-and-hold processing while holding the intensity of the bias 26 at a constant value PI_. The intensity of the first output 22a of the first hold unit 6a thus changes to a constant value I1 and is held at this constant value I1. In the FIG. 3, "I1" is arranged at a vertical position indicating the intensity of the output 16 held by a first hold unit 6a via the monitor unit 4, the output 16 outputted from the controlled region 14. The same applies to I2-I6 in FIGS. 3 to 6.

The control unit 10 then alters the intensity of the bias 26 to PI_+, which differs from PI_, and causes the second hold unit 6b to perform the second sample-and-hold processing while holding the intensity of the bias 26 at PI_+. The intensity of the second output 22b of the second hold unit 6b thus changes to a constant value I2 and is held at this constant value I2.

As illustrated in FIG. 3, when the center 34 of the square wave portion 27 of the bias temporal change TC26 is approximately equal to the bias value 132 at the null point 32, the intensity Ia, which is an intensity of the output 16 before the bias 26 is altered (I1 in this example), is approximately equal to the intensity Ib after the altering (I2 in this example). This results in the differential output 24 of the differential unit 8 being approximately zero.

FIG. 4 illustrates an example in which the center 34 of the square wave portion 27 of the bias temporal change TC26 is not equal to the bias value 132 at the null point 32. The control unit 10 causes the first hold unit 6a to perform the first sample-and-hold processing while holding the bias 26 at a constant value PII_. The intensity of the first output 22a of the first hold unit 6a thus changes to a constant value I3 and is held at this constant value I3.

The control unit 10 then alters the intensity of the bias 26 to PII_+, which differs from PII_, and causes the second hold unit 6b to perform the second sample-and-hold processing while holding the intensity of the bias 26 at PII_+. The intensity of the second output 22b of the second hold unit 6b thus changes to a constant value I4 and is held at this constant value I4.

As illustrated in FIG. 4, when the center 34 of the square wave portion of the bias temporal change TC26 is not equal to the bias value 132 at the null point 32, the intensity Ia, which is an intensity of the output 16 of the controlled region 14 before the bias 26 is altered, differs from the intensity Ib after the altering. This results in the absolute value of the differential output 24 being greater than that in the example of FIG. 3.

In this case, the control unit 10 alters the center 34 of the bias temporal change TC26 (i.e., the average value of the bias 26) so that the absolute value of the differential output 24 is reduced. For instance, in the example illustrated in FIG. 4, the control unit 10 controls the bias 26 so that the center 34 of the bias temporal change TC26 decreases.

The control unit 10 repeats this processing, so that the differential output 24 eventually becomes approximately zero. As a result, the center 34 of the bias temporal change TC26 becomes approximately equal to the bias value 132 at the null point 32 (see FIG. 3).

In other words, the processing of the control unit 10 is repeated so that the average value (=(Ia+Ib)/2) for the output 16 of the controlled region 14 approaches the minimum value $I_{min}$ of the output 16 (i.e., a target value of the output 16). This allows the average value $I_{AV}$ of the output 16 of the controlled region 14 to eventually become approximately equal to the minimum value $I_{min}$ of the output 16.

(3) Control with Bandpass Filter

Figure 5:
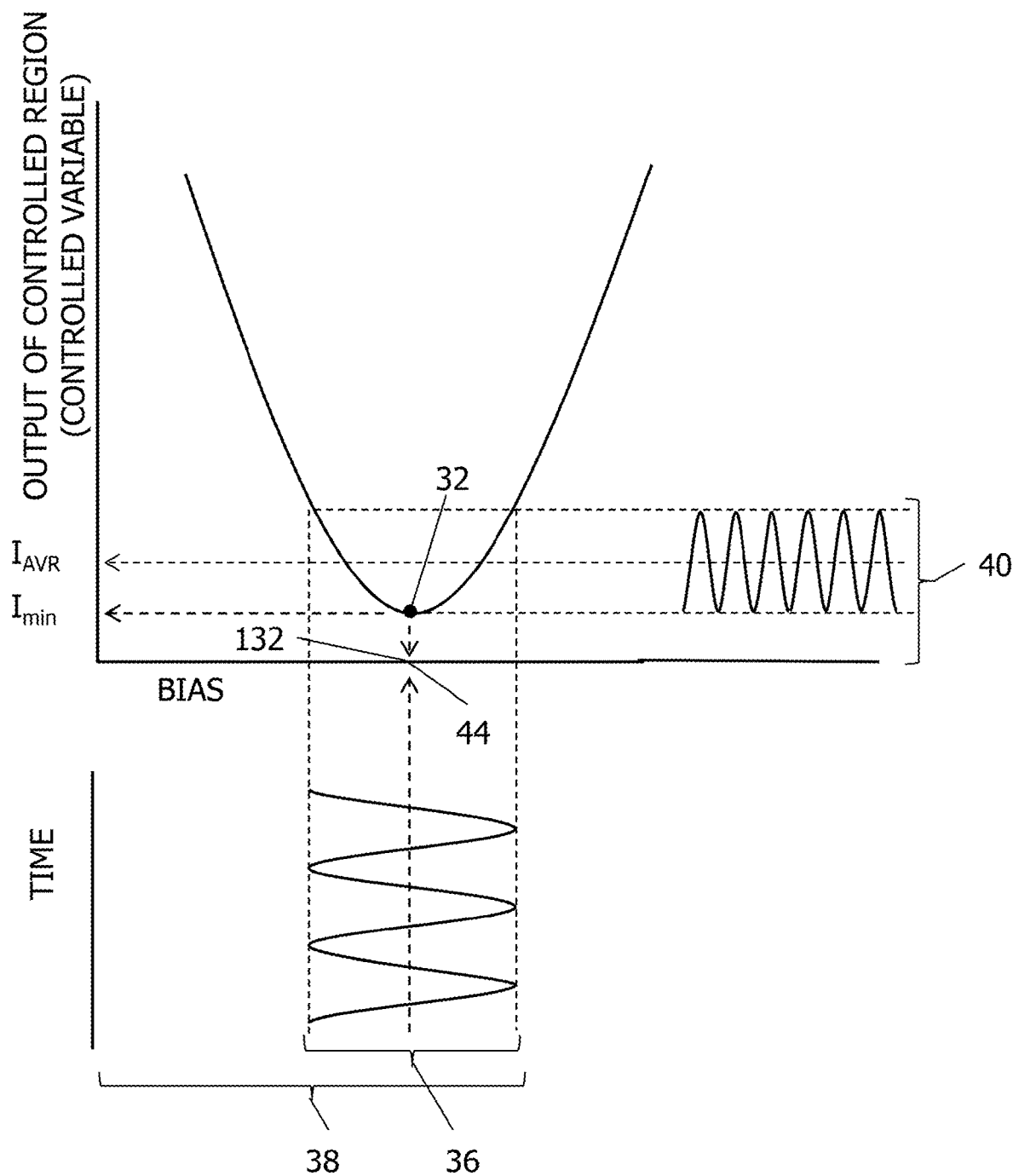
FIGS. 5 and 6 are diagrams illustrating control that uses a bias 38 on which a sine wave 36 is superimposed.
Figure 6:
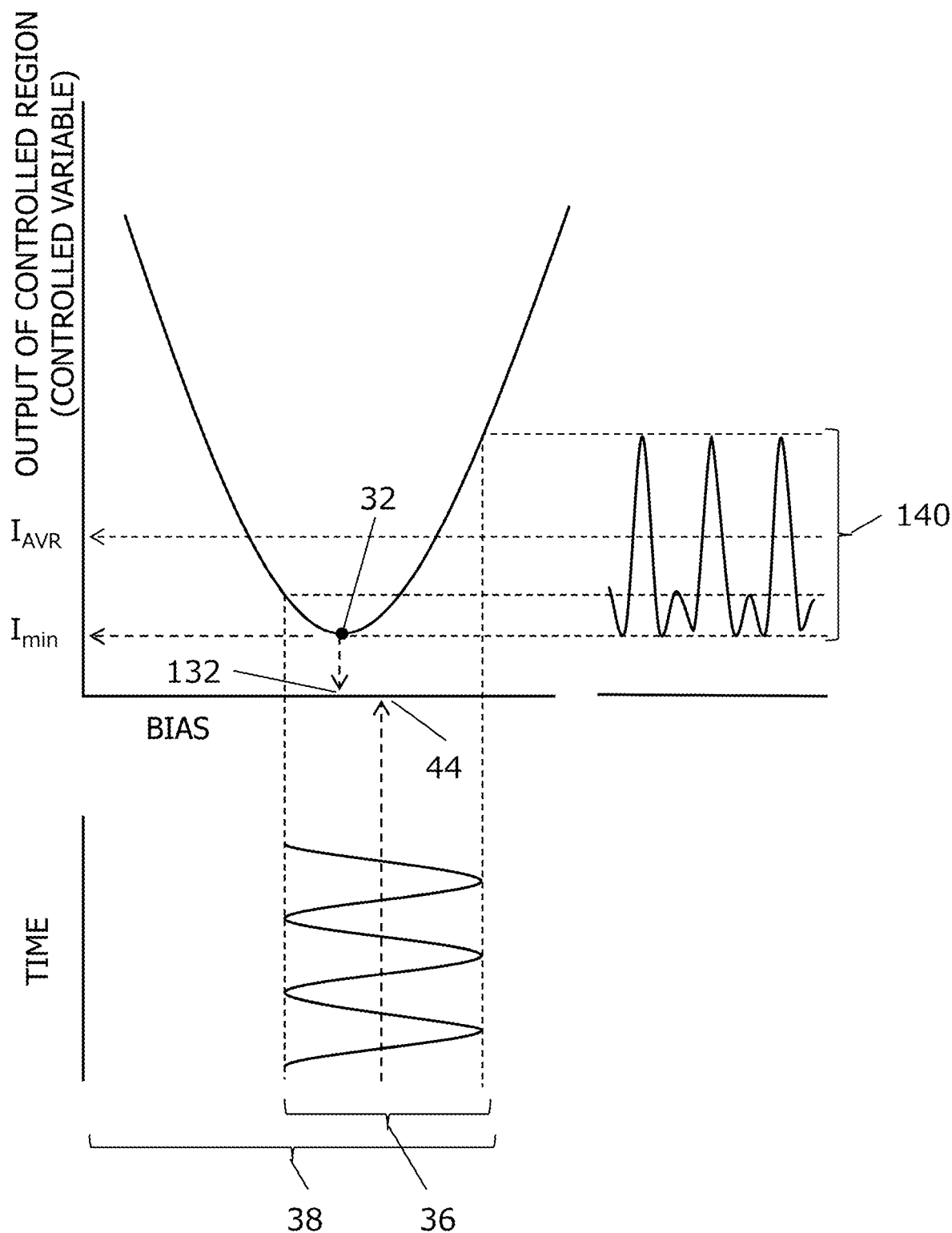

FIGS. 5 and 6 are diagrams illustrating control that uses a bias 38 on which a sine wave 36 is superimposed. In this example, a sine wave 36 (hereinafter referred to as a sine wave dither) is used to control the bias of a Mach-Zehnder modulator.

In a same manner as the examples illustrated in FIGS. 3 and 4, the bias 38 is inputted to a heater provided adjacent to an optical waveguide of the Mach-Zehnder modulator.

A response 40 of the Mach-Zehnder modulator to the bias 38 (hereinafter referred to as a dither response) is inputted to a bandpass filter (not illustrated). The bandpass filter to which the dither response 40 is inputted passes a signal oscillating at a frequency f that is equal to the frequency of the sine wave dither 36 (hereinafter referred to as a dither component), and blocks a signal oscillating at a frequency 2f that is twice the frequency of the sine wave dither 36. The bias 38 is controlled based on the dither component that passes through the bandpass filter.

FIG. 5 illustrates an example in which the center 44 of the sine wave dither 36 is approximately equal to the bias value 132 at the null point 32. In this case, the dither response 40 oscillates at the frequency 2f that is twice the frequency f of the sine wave dither 36. The dither response 40 therefore does not include the dither component (i.e., a signal that oscillates at the same frequency f as the sine wave dither 36).

FIG. 6 illustrates an example in which the center 44 of the sine wave dither 36 is not equal to the bias value 132 at the null point 32. In this case, the dither response 140 oscillates at the same frequency f as the sine wave dither 36. The dither response 140 therefore includes the dither component, which oscillates at the frequency f.

The bandpass filter extracts the dither component, and the bias 38 is controlled so that the amplitude of the extracted dither component decreases.

This control is repeated until the amplitude of the dither component becomes approximately zero. The center 44 of the sine wave dither 36 thus eventually becomes approximately equal to the bias value 132 at the null point 32. When this is achieved, the average value $I_{AV}$ of the output 16 of the controlled region 14 is approximately equal to the minimum value $I_{min}$ of the output 16.

Bandpass filters include capacitors that are difficult to reduce in size. It is thus difficult to reduce the size of the bandpass filter used to extract the dither component. In contrast, technological innovations, e.g., silicon photonics, have enabled optical devices, e.g., Mach-Zehnder modulators, to have smaller sizes.

Consequently, controllers that use sine wave dither signals are becoming great relative to the devices to be controlled. In contrast, the controller 2 of the first embodiment described with reference to FIGS. 1 to 4 does not use a bandpass filter and therefore can be reduced in size without difficulty. That is, the first embodiment allows a device for controlling the bias of a Mach-Zehnder modulator or other devices (i.e. a bias controller) to have a smaller size.

The bandpass filter for dither component extraction not only removes a signal oscillating at the frequency 2f that is twice the frequency f of the sine wave dither 36 (i.e., a harmonic of the dither component), but also removes noise in the dither response 40, 140 (see FIGS. 5 and 6).

The controller 2 described with reference to FIGS. 1 to 4 removes low-frequency noises of frequencies lower than the frequency of the square wave portion 27 of the bias 26 (hereinafter referred to as a bias frequency) by the differential processing in the differential unit 8. High-frequency noises of frequencies higher than the bias frequency pass through the differential unit 8. Such high-frequency noises can be easily removed by digital signal processing in the control unit 10.

The controller 2 illustrated in FIGS. 1 and 2 includes the differential unit 8. However, the differential unit 8 may be omitted. In this case, the controller 2 may calculate the difference between the first output 22a and the second output 22b by digital signal processing in the control unit 10, and control the bias 26 based on the calculated difference.

(4) Control Method

Figure 7:
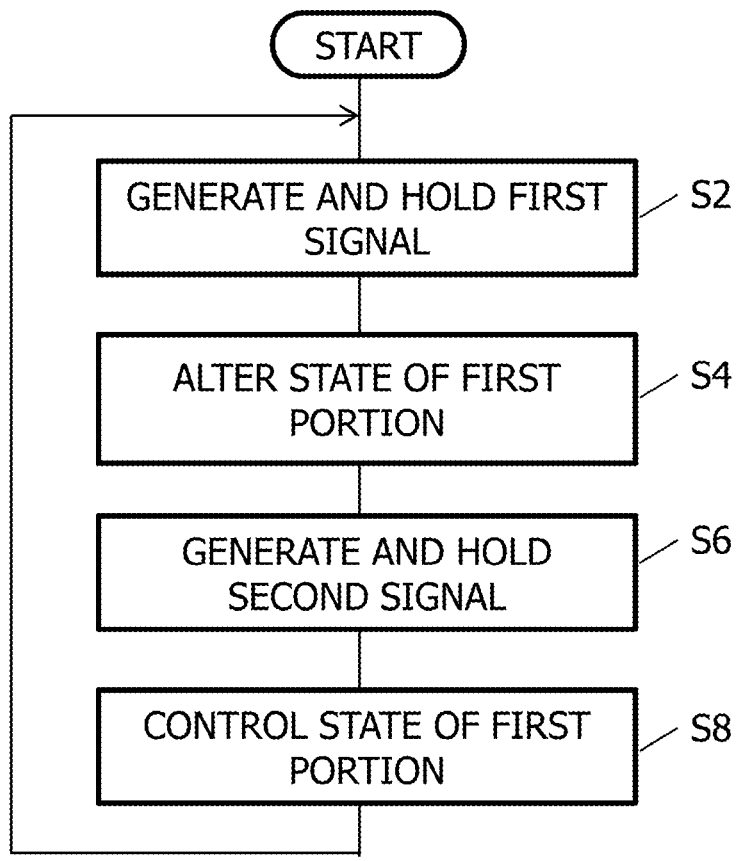
FIG. 7 is a diagram illustrating an example of a control method of the first embodiment.

FIG. 7 is a diagram illustrating an example of a control method of the first embodiment.

First, Step (i.e. Process) S2 generates a first signal (i.e. a first output 22a), which changes according to the intensity of the output 16, while holding the state of the first portion 18a (see FIG. 2) constant, and then holds the generated first signal.

After Step S2, Step S4 alters the state of the first portion 18a.

After Step S4, Step S6 generates a second signal (i.e. a second output 22b), which changes according to the intensity of the output 16, while holding the altered state of the first portion 18a constant, and then holds the generated second signal.

After Step S6, Step S8 controls the state of the first portion 18a based on the difference between the intensity of the held first signal and the intensity of the held second signal.

Steps S2 to S8 may be repeated so that the average value for the intensity of the output 16 before the altering and the intensity of the output 16 after the altering approaches the target value for the output 16.

As described with reference to FIGS. 1 to 4, the first embodiment controls the bias 26 based on the difference between the first and second outputs 22a and 22b of the first and second hold units 6a and 6b, the first and second outputs 22a and 22b changing according to the intensity of the output 16 of the controlled region 14 (i.e., the controlled variable). This achieves bias control without a bandpass filter. The first embodiment thus facilitates a reduction of the size of the bias controller for a Mach-Zehnder modulator and so on.

Second Embodiment

The second embodiment is almost identical to the first embodiment. The descriptions of the configurations and so on that are the same as those of the first embodiment are omitted or simplified.

(1) Structure (1-1) Functional Block

Figure 8:
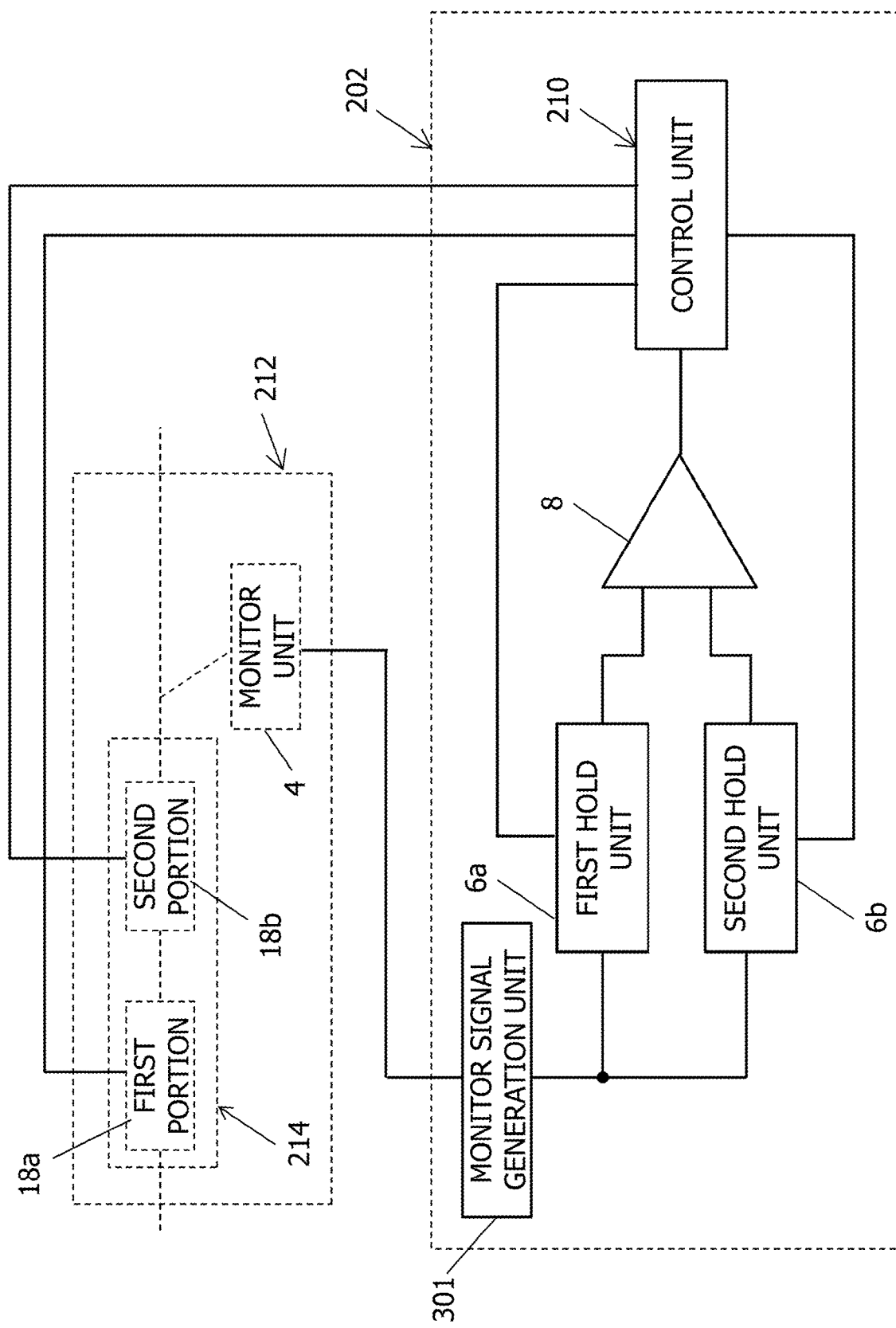
FIG. 8 is an example of a functional block diagram of a controller 202 of the second embodiment.

FIG. 8 is an example of a functional block diagram of a controller 202 of the second embodiment. As illustrated in FIG. 8, the controller 202 is almost identical to the controller 2 of the first embodiment.

However, in the second embodiment, the controlled region 214, which is controlled by the controller 202, has a first portion 18a and a second portion 18b that differs from the first portion 18a. The controlled region 214 is an example of the controlled region 14 of the first embodiment (see FIG. 1). The controlled region 214 generates an output (i.e., a controlled variable), which changes according to the state of the first portion 18a and the state of the second portion 18b. The control unit 210 of the controller 202 controls the states of the first and second portions 18a and 18b based on the differential output of the differential unit 8. The controller 202 also includes a monitor signal generation unit 301.

(1-2) Hardware Configuration

Figure 9:
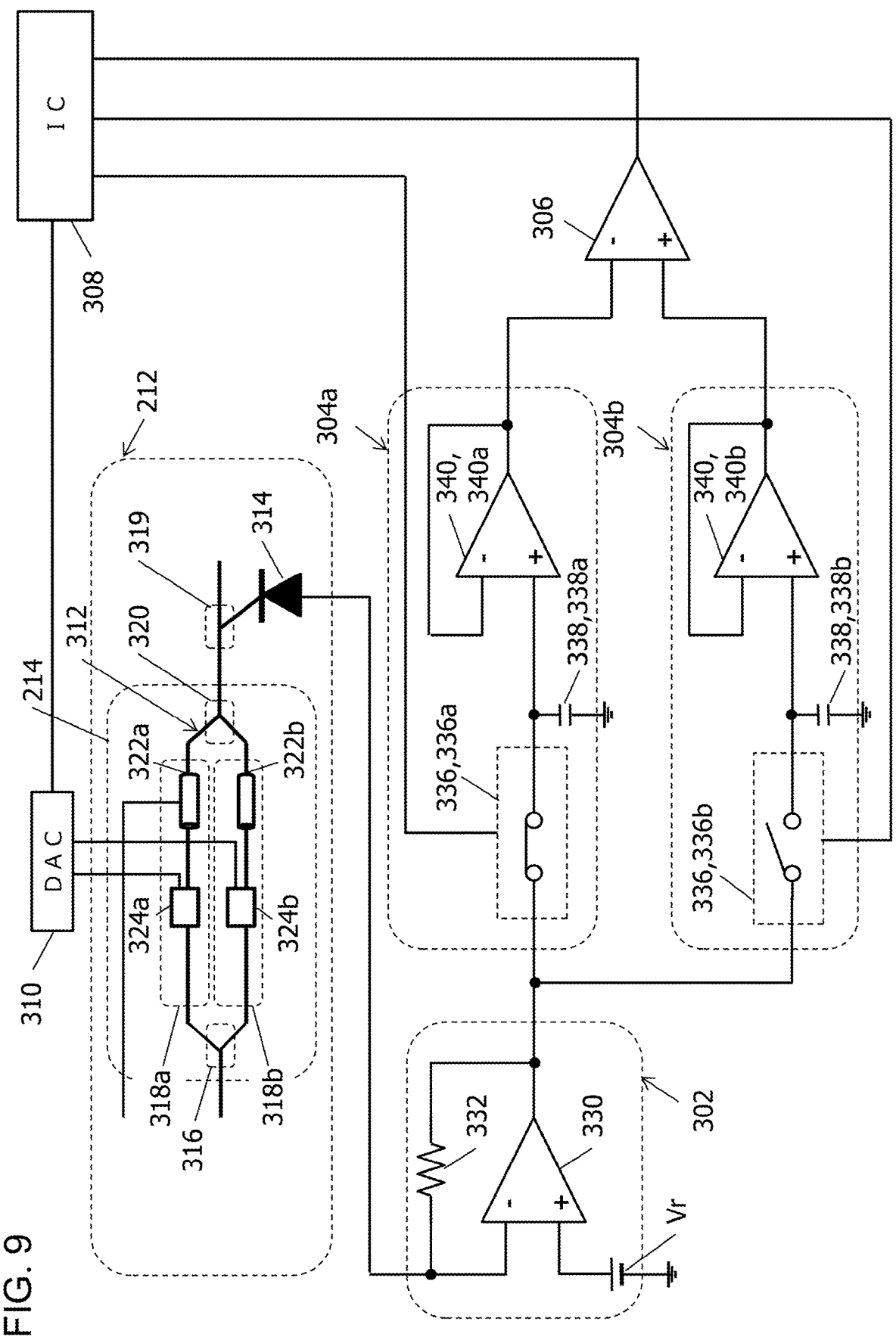
FIG. 9 is a diagram illustrating an example of the hardware configuration of the controller 202.

FIG. 9 is a diagram illustrating an example of the hardware configuration of the controller 202 (see FIG. 8). FIG. 9 also illustrates the hardware configuration of a device 212 controlled by the controller 202.

The controller 202 of the example illustrated in FIG. 9 includes a transimpedance amplifier 302, a first sample-and-hold circuit 304a, a second sample-and-hold circuit 304b, and a differential amplifier 306. The controller 202 also includes a digital-to-analog converter 310 and an integrated circuit 308 for digital coherent communication.

The integrated circuit 308 of the example illustrated in FIG. 9 has a function of converting analog signal into digital signal. If the integrated circuit 308 does not have this function, the controller 202 may include an analog-to-digital converter that converts the output of the differential amplifier 306 into digital signal.

The transimpedance amplifier 302 may serve as the monitor signal generation unit 301 (see FIG. 8). The monitor signal generation unit 301 generates a monitor signal 217 (see FIG. 10 described later), which changes according to the output 216 of the controlled region 214 (see FIG. 10). The monitor signal generation unit 301 may be external to the controller 202 (see FIG. 8). For instance, the monitor signal generation unit 301 may be provided in the device 212 or between the device 212 and the controller 202. In other words, the transimpedance amplifier 302 may be external to the controller 202.

The first sample-and-hold circuit 304a serves as the first hold unit 6a (see FIG. 8). The second sample-and-hold circuit 304b serves as the second hold unit 6b. The differential amplifier 306 serves as the differential unit 8. The integrated circuit 308 and the digital-to-analog converter 310 serve as the control unit 210.

Alternatively, an analog-to-digital converter connected to the differential amplifier 306, a memory, a central processing unit (CPU) connected to the memory, and the digital-to-analog converter 310 may serve as the control unit 210 (see the third embodiment). Further, a field-programmable gate array (FPGA) and the digital-to-analog converter 310 may serve as the control unit 210.

The device 212 includes a Mach-Zehnder modulator 312, which is formed in the controlled region 214, and a photodetector 314. The Mach-Zehnder modulator 312 may be a modulator formed by silicon photonics. The photodetector 314 may be a photodiode. The photodetector 314 may be optically connected to a combiner 320 of the Mach-Zehnder modulator 312 via a Y splitter 319.

The Mach-Zehnder modulator 312 has a splitter 316, a first optical waveguide 318a, a second optical waveguide 318b, and the combiner 320. The Mach-Zehnder modulator 312 also includes a first electrode 322a connected to the core of the first optical waveguide 318a, and a second electrode 322b connected to the core of the second optical waveguide 318b. The cores of the first and second optical waveguides 318a and 318b may be silicon having a pn junction.

The Mach-Zehnder modulator 312 also includes a first heater 324a that is arranged along the first optical waveguide 318a, and a second heater 324b that is arranged along the second optical waveguide 318b. The first and second heaters 324a and 324b may be thin film heaters. The first heater 324a heats the section of the first optical waveguide 318a, the section being adjacent to the first heater 324a. The second heater 324b heats the section of the second optical waveguide 318b, the section being adjacent to the second heater 324b.

In the example illustrated in FIG. 9, the first heater 324a serves as the first portion 18a (see FIG. 8). The second heater 324b serves as the second portion 18b (see FIG. 8). The photodetector 314 serves as the monitor unit 4 (see FIG. 8).

Figure 10:
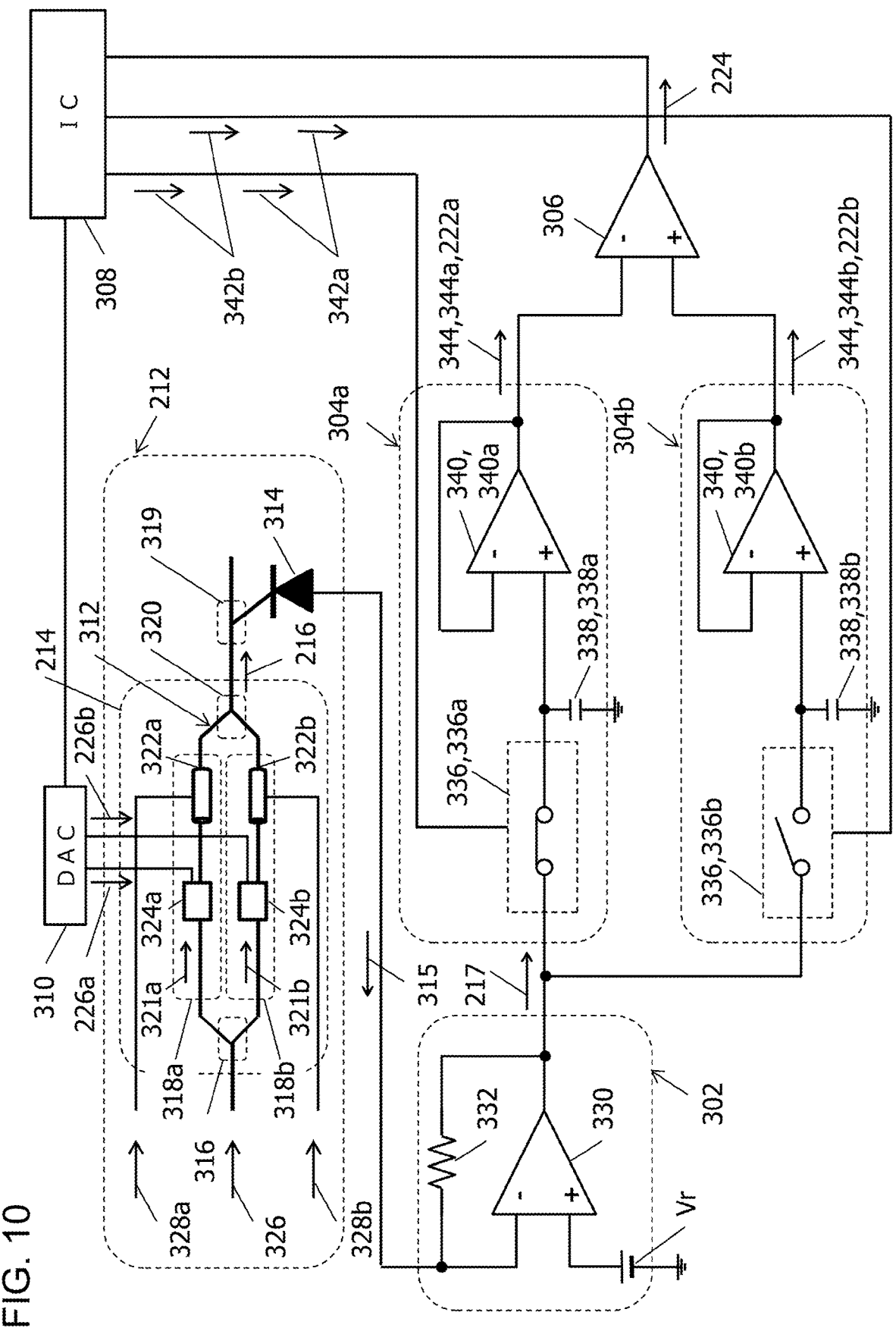
FIG. 10 is a diagram illustrating the operation of the hardware of the controller 202.

FIG. 10 is a diagram illustrating the operation of the hardware of the controller 202. The splitter 316 divides (i.e. splits) the light 326 (e.g., continuous light), which is inputted to the controlled region 214, into a first split light 321a and a second split light 321b.

The first split light 321a is inputted to the first optical waveguide 318a. The first optical waveguide 318a modulates the phase of the first split light 321a with a first electric signal 328a inputted to the first electrode 322a. The second split light 321b is inputted to the second optical waveguide 318b. The second optical waveguide 318b modulates the phase of the second split light 321b with a second electric signal 328b inputted to the second electrode 322b.

The combiner 320 generates an output 216 by combining the first split light 321a modulated by the first optical waveguide 318a and the second split light 321b modulated by the second optical waveguide 318b. The generated output 216 is outputted from the controlled region 214.

Supplying electric power to the first heater 324a increases the temperature of the first heater 324a, thereby increasing the temperature of the section of the first optical waveguide 318a, the section being adjacent to the first heater 324a. This increases the refractive index of this section, changing the phase of the first split light 321a. That is, the phase of the first split light 321a changes according to the state (in this example, the temperature) of the first heater 324a (i.e. the first portion 18a). Likewise, the phase of the second split light 321b changes according to the state (in this example, the temperature) of the second heater 324b (i.e. the second portion 18b).

The modulation of the first split light 321a with the first electric signal 328a (hereinafter referred to as first modulation) is a process different from the power supply to the first heater 324a (that is, the control of the state of the first portion). Likewise, the modulation of the second split light 321b with the second electric signal 328b (hereinafter referred to as second modulation) is a process different from the power supply to the second heater 324b (that is, the control of the state of the second portion).

The Y splitter 319 divides the output 216 of the controlled region 214, and inputs one of the divided outputs 216 (hereinafter referred to as monitor light) to the photodetector 314. The photodetector 314 photoelectrically converts the inputted monitor light to generate a photocurrent 315.

The transimpedance amplifier 302 may be a current-voltage conversion circuit including an operational amplifier 330 and a resistor 332. The photocurrent 315 is inputted to the resistor 332 connected to the inverting input terminal of the operational amplifier 330. A reference potential Vr is inputted to the non-inverting input terminal of the operational amplifier 330. The transimpedance amplifier 302 converts the photocurrent 315 into a monitor signal 217, which changes according to the intensity of the photocurrent 315.

The first and second sample-and-hold circuits 304a and 304b each have a switch circuit 336, a capacitor 338, and a voltage follower 340.

The switch circuit 336 closes in response to a first signal 342a (hereinafter referred to as a close signal). This connects the transimpedance amplifier 302 to the voltage follower 340. The switch circuit 336 opens in response to a second signal 342b (hereinafter referred to as an open signal) different from the close signal 342a. This disconnects the transimpedance amplifier 302 from the voltage follower 340.

When the switch circuit 336 connects the transimpedance amplifier 302 to the voltage follower 340, the voltage of the output 344 of the voltage follower 340 becomes approximately equal to the voltage of the monitor signal 217. When the switch circuit 336 then disconnects the transimpedance amplifier 302 from the voltage follower 340, the voltage of the output 344 of the voltage follower 340 is fixed to the voltage before the disconnection.

The first output 222a of the first sample-and-hold circuit 304a is the output 344a of the voltage follower 340a of the first sample-and-hold circuit 304a. The second output 222b of the second sample-and-hold circuit 304b is the output 344b of the voltage follower 340b of the second sample-and-hold circuit 304b.

Thus, when the switch circuit 336a is closed, the first output 222a of the first sample-and-hold circuit 304a changes according to the intensity of the monitor signal 217. When the switch circuit 336a is opened, the intensity of the first output 222a is maintained at the intensity immediately before the switch circuit 336a is opened. That is, the first output 222a is held.

In a same manner, when the switch circuit 336b is closed, the second output 222b of the second sample-and-hold circuit 304b (i.e. the output 344b of the voltage follower 340b) changes according to the intensity of the monitor signal 217. When the switch circuit 336b is opened, the intensity of the second output 222b is fixed to the intensity before the switch circuit 336b is opened. That is, the second output 222b is held.

The first output 222a and the second output 222b are inputted to the differential amplifier 306. The output 224 of the differential amplifier 306 changes according to the difference between the voltage of the first output 222a and the voltage of the second output 222b.

The integrated circuit 308 controls the opening and closing of the switch circuits 336. The integrated circuit 308 also calculates the values of the voltages to be applied to the first and second heaters 324a and 324b (hereinafter referred to as voltage values) based on the differential output 224 of the differential amplifier 306. The integrated circuit 308 first calculates the electric power to be supplied to each of the first and second heaters 324a and 324b, and converts the calculated electric power into the above voltage value.

The calculated voltage value is inputted to the digital-to-analog converter 310. The digital-to-analog converter 310 converts the inputted voltage value into voltages and supplies it to the first and second heaters 324a and 324b.

In this example, the first portion 18a is the first heater 324a. However, the first portion 18a is not limited to a heater. The first portion 18a may be the core of the first optical waveguide 318a, the core being provided with a pn junction. In this case, the carrier density of the core changes according to the voltage outputted by the digital-to-analog converter 310. The phase of the first split light 321a changes accordingly. The same applies to the second portion 18b.

In the example described above, the transimpedance amplifier 302 converts the photocurrent 315 into a monitor signal 217. However, the device that converts the photocurrent 315 into a monitor signal 217 is not limited to the transimpedance amplifier 302. For instance, the photocurrent 315 may be converted into a monitor signal 217 by a resistor (see the third embodiment).

Figure 11:
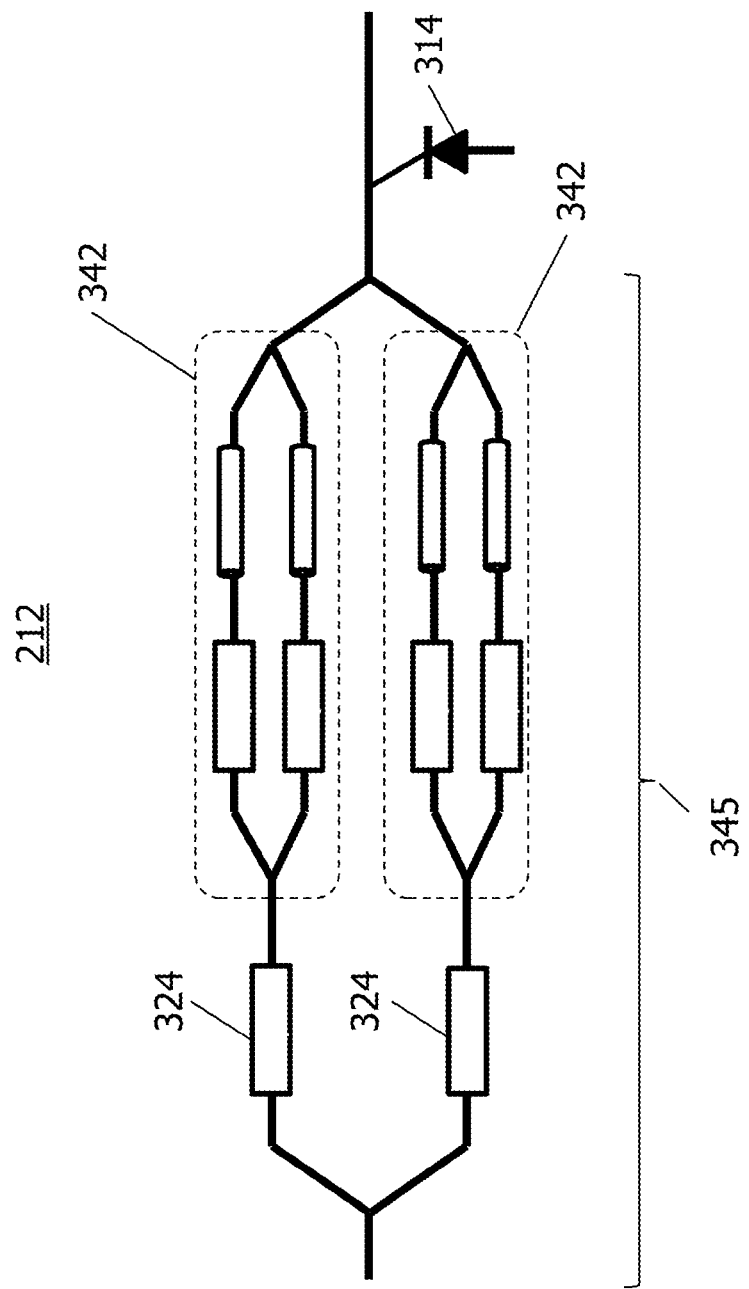
FIG. 11 is a diagram illustrating an example of the device 212 controlled by the controller 202.

FIG. 11 is a diagram illustrating an example of the device 212 controlled by the controller 202 (see FIG. 8). The device 212 illustrated in FIG. 11 is a differential quadrature phase-shift keying (DQPSK) modulator. The DQPSK modulator includes two child Mach-Zehnder modulators 342 and a parent Mach-Zehnder modulator 345. The Mach-Zehnder modulator 312 illustrated in FIG. 9 may be one of the child Mach-Zehnder modulators 342. The integrated circuit 308 (i.e., the control unit 210) may control both of the child Mach-Zehnder modulators 342. The integrated circuit 308 (i.e., the control unit 210) may further control the heater 324 of the parent Mach-Zehnder modulator 345.

(2) Operation

Figure 12:
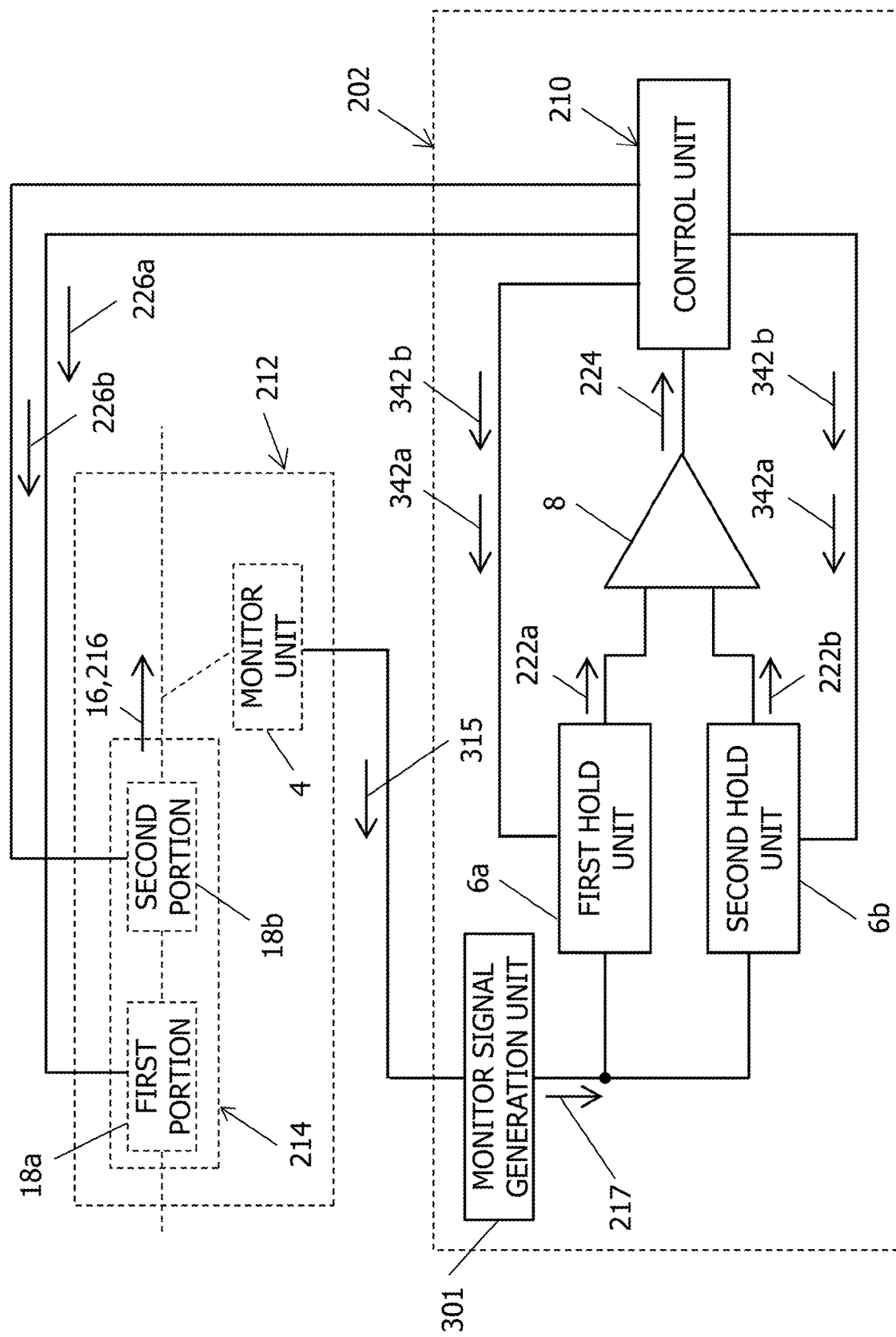
FIG. 12 is a diagram illustrating the operation of the controller 202.

FIG. 12 is a diagram illustrating the operation of the controller 202. The operations of the first and second hold units 6a and 6b are described in the first embodiment. The operations of the monitor unit 4 and the differential unit 8 are also described in the first embodiment. The control unit 210 inputs a first bias 226a to the first portion 18a and inputs a second bias 226b to the second portion 18b at the same time. The control unit 210 controls the first bias 226a and the second bias 226b based on the differential output 224 of the differential unit 8.

Figure 13:
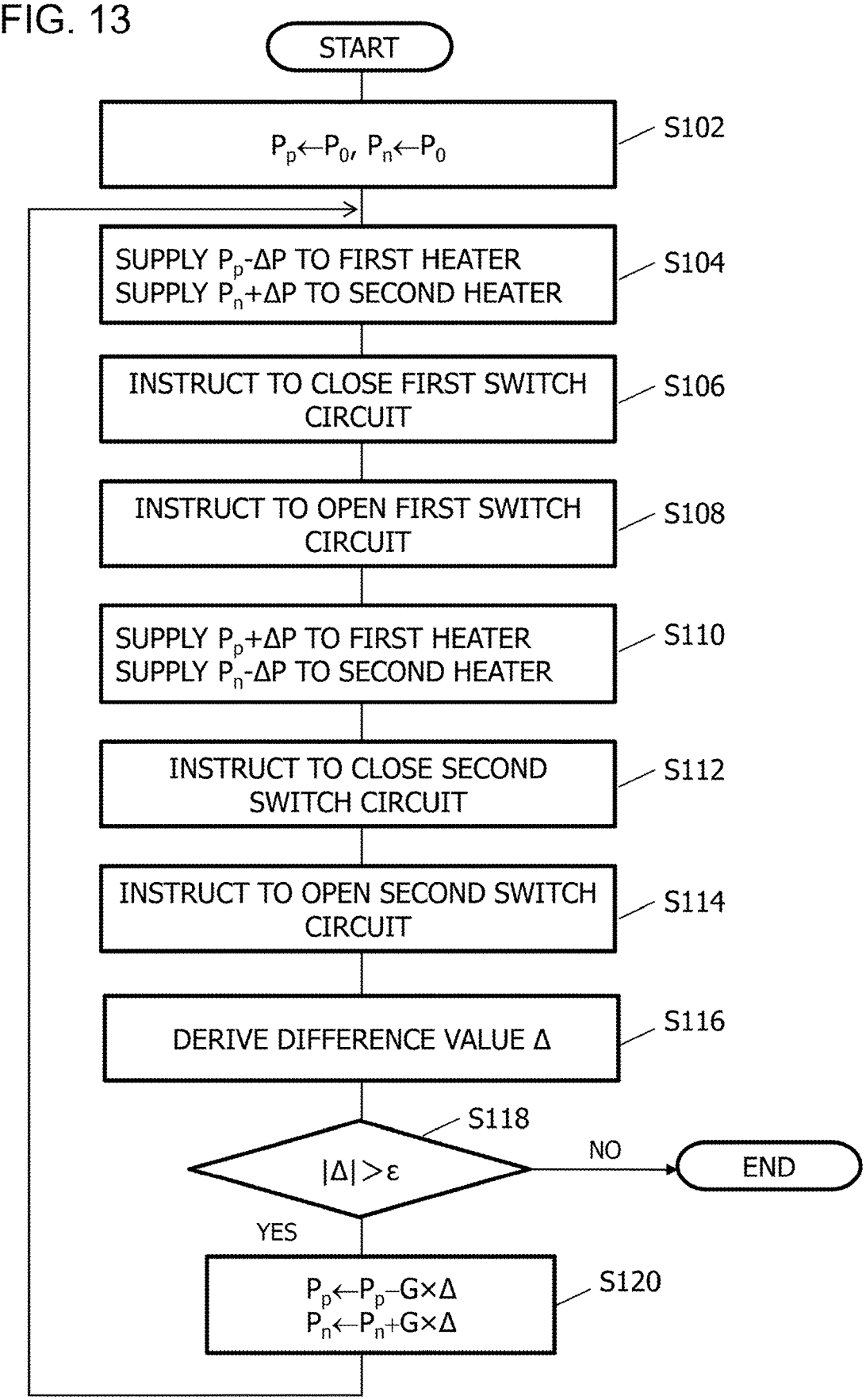
FIG. 13 is a flowchart illustrating an example of processing performed by the control unit 210.

FIG. 13 is a flowchart illustrating an example of processing performed by the control unit 210. In the following example, the controller 202 includes a resistor (see FIG. 15 described later) instead of the transimpedance amplifier 302. The other hardware configurations are the same as those of the controller 202 (see FIG. 12) described with reference to FIGS. 9 and 10.

Step S102

The control unit 210 (see FIG. 12) first assigns an initial value P0 to a variable $P_p$. The control unit 210 also assigns the initial value P0 to a variable $P_n$.

Step S104

After Step S102, the control unit 210 subtracts ΔP (>0) from the variable $P_p$ to obtain the value of the electric power to be supplied to the first heater 324a (i.e., the first bias 226a). The control unit 210 supplies the calculated electric power (=$P_p$−ΔP) to the first heater 324a (see FIG. 10). Here, the control unit 210 converts the calculated electric power into a voltage value, and the digital-to-analog converter 310 converts the calculated voltage value into a voltage. The same applies to the subsequent steps. ΔP may be a constant of less than or equal to $P_0$.

Additionally, the control unit 210 adds ΔP to the variable $P_n$ to calculate the value of the electric power to be supplied to the second heater 324b (i.e., the second bias 226b). The control unit 210 (see FIG. 12) supplies the calculated electric power (=$P_n$+ΔP) to the second heater 324b (see FIG. 10).

Step S104 changes the temperatures of the first and second heaters 324a and 324b. This, in turn, changes the output 216 of the Mach-Zehnder modulator 312.

Step S106

After Step S104, the control unit 210 (see FIG. 12) transmits a close signal 342a to a first switch circuit 336a (see FIG. 10). The first switch circuit 336a closes in response to the close signal 342a.

Step S108

After Step S106, the control unit 210 (see FIG. 12) transmits an open signal 342b to the first switch circuit 336a (see FIG. 10). The first switch circuit 336a opens in response to the open signal 342b.

In the interval between the completion of Step S106 and the start of Step S108, the first hold unit 6a (see FIG. 12) changes the intensity of the first output 222a according to the intensity of the monitor signal 217. When the first switch circuit 336a (see FIG. 10) opens at Step S108, the first hold unit 6a (see FIG. 12) holds the changed intensity of the first output 222a.

Step S110

After Step S108, the control unit 210 adds ΔP to the variable $P_p$ to calculate the value of the electric power (i.e., the first bias 226a) to be supplied to the first heater 324a (see FIG. 10). The control unit 210 (see FIG. 12) supplies the calculated electric power (=$P_p$+ΔP) to the first heater 324a.

The control unit 210 also subtracts ΔP from the variable $P_n$ to calculate the value of the electric power to be supplied to the second heater 324b (i.e., the second bias 226b). The control unit 210 supplies the calculated electric power (=$P_n$−ΔP) to the second heater 324b.

Step S110 alters the temperatures of the first and second heaters 324a and 324b. This, in turn, alters the output 216 of the Mach-Zehnder modulator 312 (see FIG. 10).

Step S112

After Step S110, the control unit 210 (see FIG. 12) transmits a close signal 342a to the second switch circuit 336b (see FIG. 10). The second switch circuit 336b closes in response to the close signal 342a.

Step S114

After Step S112, the control unit 210 (see FIG. 12) transmits an open signal 342b to the second switch circuit 336b (see FIG. 10). The second switch circuit 336b opens in response to the open signal 342b.

In the interval between the completion of Step S112 and the start of Step S114, the second hold unit 6b (see FIG. 12) changes the intensity of the second output 222b according to the intensity of the monitor signal 217. When the second switch circuit 336b (see FIG. 10) opens at Step S114, the second hold unit 6b (see FIG. 12) holds the intensity of the changed second output 222b.

Step S116

The control unit 210 performs analog-to-digital conversion of the differential output 224 of the differential unit 8 to derive a value Δ of the differential output 224 (hereinafter referred to as a differential value).

Step S118

After Step S116, the control unit 210 determines whether the absolute value of the differential value Δ derived at Step S116 is greater than a permissible value ε. When the absolute value of the differential value Δ is less than or equal to permissible value ε, the control unit 210 ends the control.

When the absolute value of the differential value Δ is greater than the permissible value E, the control unit 210 proceeds to Step S120.

Step S120

The control unit 210 calculates a new $P_p$ (=$P_p$−G×Δ) by subtracting from the variable $P_p$ a value calculated by multiplying the differential value Δ by a gain G (>0).

The control unit 210 also calculates a new $P_n$ (=$P_n$+G×Δ) by adding to the variable $P_n$ a value calculated by multiplying the differential value Δ by the gain G (>0).

Figure 14:
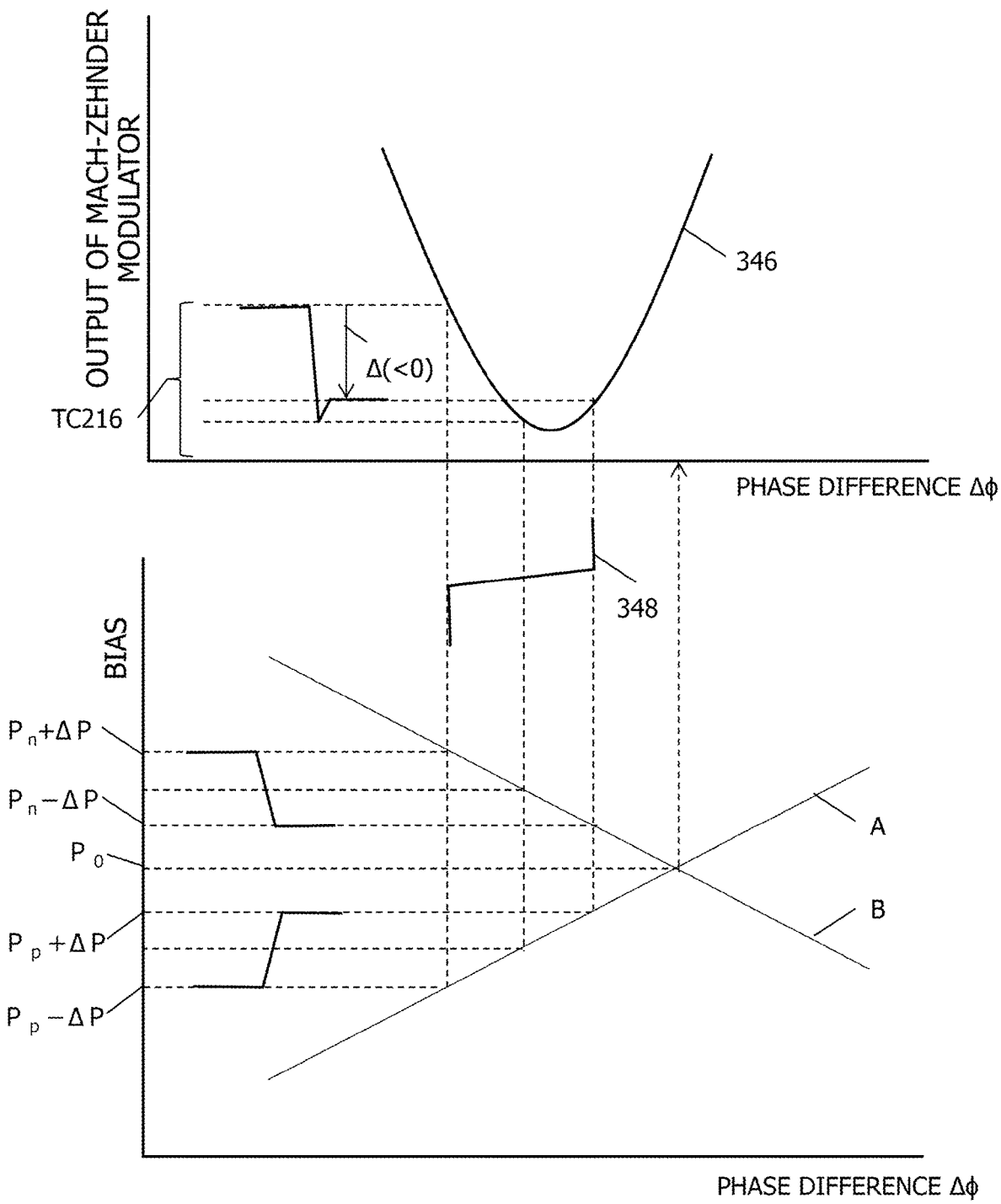
FIG. 14 is a diagram illustrating the relationship between the first and second biases 226a and 226b and the output 216 of the Mach-Zehnder modulator 312.

After Step S120, the control unit 210 restarts Steps S104 to S120. Steps S104 and S110 after the restarting update the temperatures of the first and second heaters 324a and 324b. The absolute value of the differential value Δ to be derived at Step S116 is less than the above absolute value before the updating, and thus the average value of the output 216 of the Mach-Zehnder modulator 312 approaches the target value (the minimum value of the output 216, in the second embodiment). For instance, when the differential value Δ is a negative value as illustrated in FIG. 14 described later, $P_p$ is increased, and $P_n$ is reduced. The average value of the output 216 thus approaches the minimum value.

FIG. 14 is a diagram illustrating the relationship between the first to second biases 226a and 226b and the output 216 of the Mach-Zehnder modulator 312. The representation in the upper side of FIG. 14 (hereinafter referred to as the upper representation) illustrates the relationship 346 between the output 216 of the Mach-Zehnder modulator 312 and the phase difference $\Delta_\phi$ between the first split light 321a and the second split light 321b (see FIG. 10). The vertical axis represents the output 216 of the Mach-Zehnder modulator 312. The horizontal axis represents the phase difference $\Delta_\phi$.

The representation in the lower side of FIG. 14 (hereinafter referred to as the lower representation) illustrates the relationship A between the intensity (i.e., electric power) of the first bias 226a and the phase difference $\Delta_\phi$. The lower representation also illustrates the relationship B between the intensity (i.e., electric power) of the second bias 226b and the phase difference $\Delta_\phi$.

The vertical axis represents the intensities of the first bias 226a and the second bias 226b. The horizontal axis represents the phase difference $\Delta_\phi$.

The temporal change 348 of the phase difference $\Delta_\phi$ is illustrated between the upper representation and the lower representation. A vertical position represents time. Time proceeds from bottom to top. The same applies to FIG. 18 described below. A horizontal position indicates the phase difference $\Delta_\phi$.

The graph in the left side of the upper representation illustrates the temporal change TC216 of the output 216 of the Mach-Zehnder modulator 312.

A horizontal position indicates time. Time proceeds from left to right. The same applies to FIG. 18. A vertical position indicates the intensity of the output 216 of the Mach-Zehnder modulator 312.

As indicated by the temporal change TC216 of the output 216, when the first and second biases 226a and 226b are altered at Step 110, the output 216 changes in a square wave shape in a same manner as the output 16 of the device 12 of the first embodiment (the temporal change TC16 in FIG. 4). However, the output 216 of the second embodiment has a great amount of change than the output 16 of the first embodiment.

At Step S110, the intensity of the first bias 226a changes from $P_p$−ΔP to $P_p$+ΔP by 2×ΔP. The intensity of the second bias 226b changes from $P_n$+ΔP to $P_n$−ΔP by −2×ΔP.

As a result, the phase difference $\Delta_\phi$ between the first split light 321a and the second split light 321b is twice the phase difference of the first embodiment, which changes only the first bias 226a. Accordingly, the amount of change in the output 216 of the Mach-Zehnder modulator 312 and thus the change in the monitor signal 217 are also doubled.

That is, the controller 202 of the second embodiment alters the temperature (state) of the second heater 324b (the second portion 18b) so that the change in the monitor signal 217 between before and after the altering of the temperature (state) of the first heater 324a (first portion 18a) is magnified.

As a result, the signal-to-noise ratio of the monitor signal 217 is increased, thereby improving the accuracy of the bias control.

The second embodiment thus increases the signal-to-noise ratio of the monitor signal 217 and improves the accuracy of the bias control.

Third Embodiment

The third embodiment is almost identical to the first and second embodiments. The descriptions of the configurations and so on that are the same as those of the first or second embodiment are omitted or simplified.

(1) Structure

Figure 15:
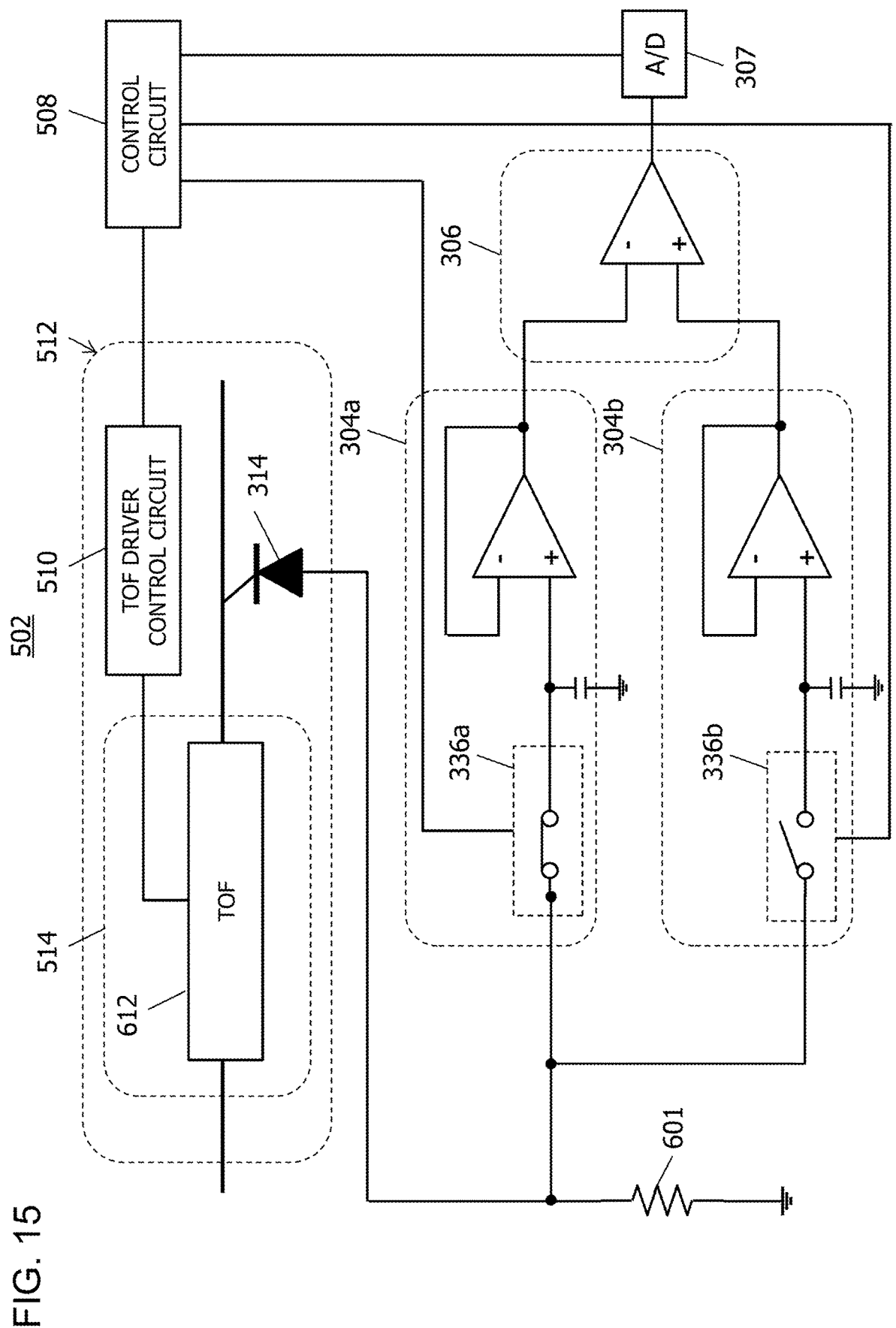
FIG. 15 is a diagram illustrating an example of the hardware configuration of a controller 502 of the third embodiment.

FIG. 15 is a diagram illustrating an example of the hardware configuration of a controller 502 of the third embodiment. FIG. 15 also illustrates a device 512 controlled by the controller 502.

The controller 502 of the third embodiment includes a resistor 601, a first sample-and-hold circuit 304a, a second sample-and-hold circuit 304b, and a differential amplifier 306. The controller 502 also includes an analog-to-digital converter 307 and a control circuit 508. The resistor 601 may be external to the controller 502. For instance, the resistor 601 may be provided in the device 512 controlled by the controller 502.

The first sample-and-hold circuit 304a is described in the second embodiment and thus not described. The same applies to the second sample-and-hold circuit 304b and the differential amplifier 306.

One end of the resistor 601 is connected to the input ports of the first and second sample-and-hold circuit 304a and 304b. The other end of the resistor 601 is connected to the reference potential (i.e., ground).

The functional block diagram of the controller 502 of the third embodiment is approximately the same as the functional block diagram of the second embodiment (see FIG. 8).

The resistor 601 (see FIG. 15) serves as the monitor signal generation unit 301 of the third embodiment. The first sample-and-hold circuit 304a serves as the first hold unit 6a. The second sample-and-hold circuit 304b serves as the second hold unit 6b. The differential amplifier 306 serves as the differential unit 8. The control circuit 508 and the analog-to-digital converter 307 serve as the control unit 210.

The functional block diagram of the device 512 controlled by the controller 502 of the third embodiment is the same as that of the device 12 of the first embodiment (see FIG. 1). The control unit 210 of the third embodiment therefore controls the first portion 18a.

Figure 16:
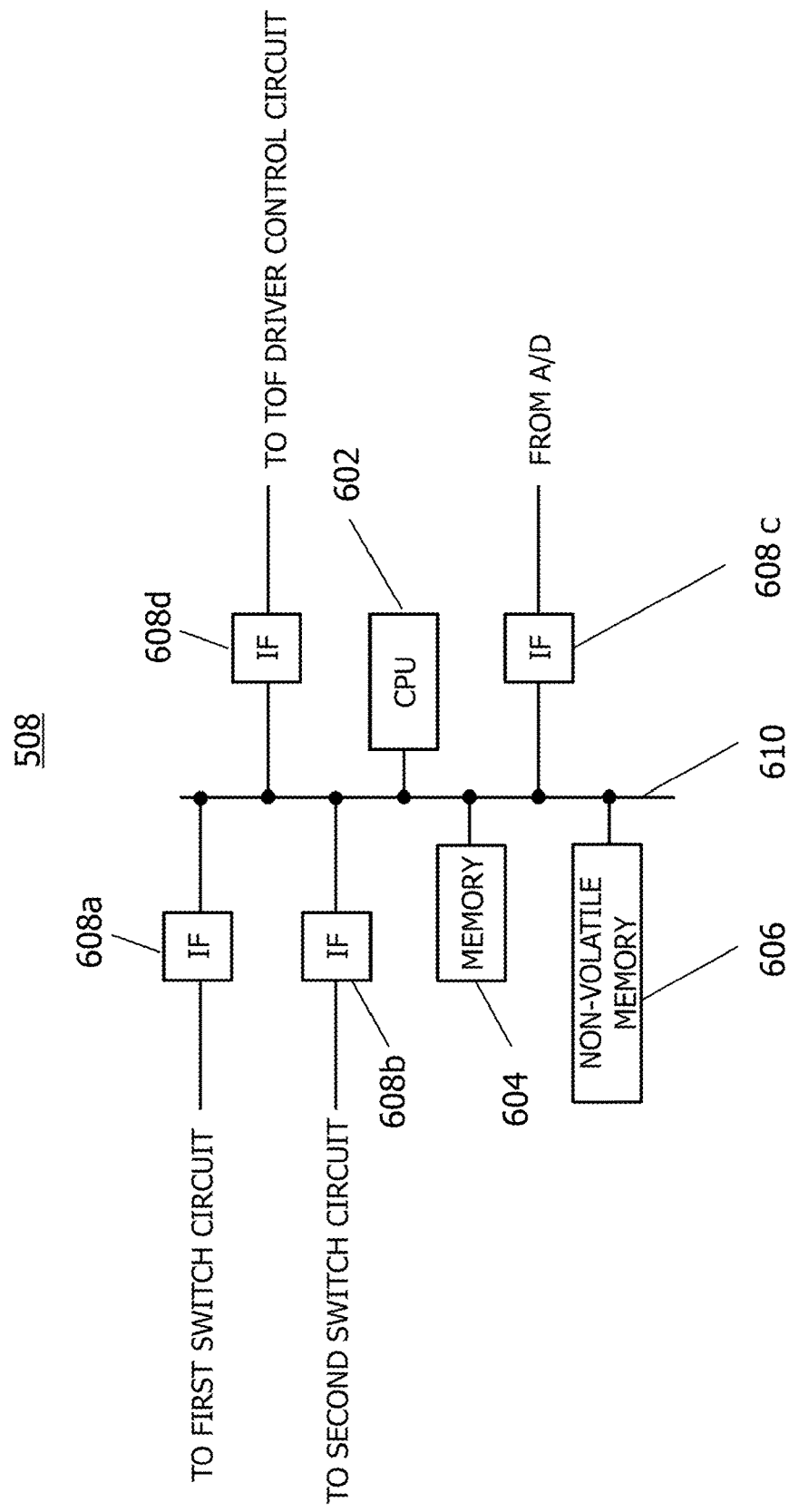
FIG. 16 is a diagram illustrating an example of the control circuit 508.

FIG. 16 is a diagram illustrating an example of the control circuit 508. The control circuit 508 includes a central processing unit (CPU) 602, a memory 604, and a non-volatile memory 606. The memory 604 may be a random access memory (RAM). The non-volatile memory 606 may be a flash memory. The control circuit 508 also includes a bus 610 that connects the CPU 602, the memory 604, and the non-volatile memory 606 to one another.

The control circuit 508 also includes a first interface 608a that connects the first switch circuit 336a to the bus 610, and a second interface 608*b* that connects the second switch circuit 336*b* to the bus 610. The control circuit 508 further includes a third interface 608*c* that connects the analog-to-digital converter 307 to the bus 610, and a fourth interface 608*d* that connects a TOF driver control circuit 510, which is described below, to the bus 610.

The CPU 602, which is connected to the memory 604 via the bus 610, is configured to run a program recorded in the non-volatile memory 606, for instance.

(2) Operation

Figure 17:
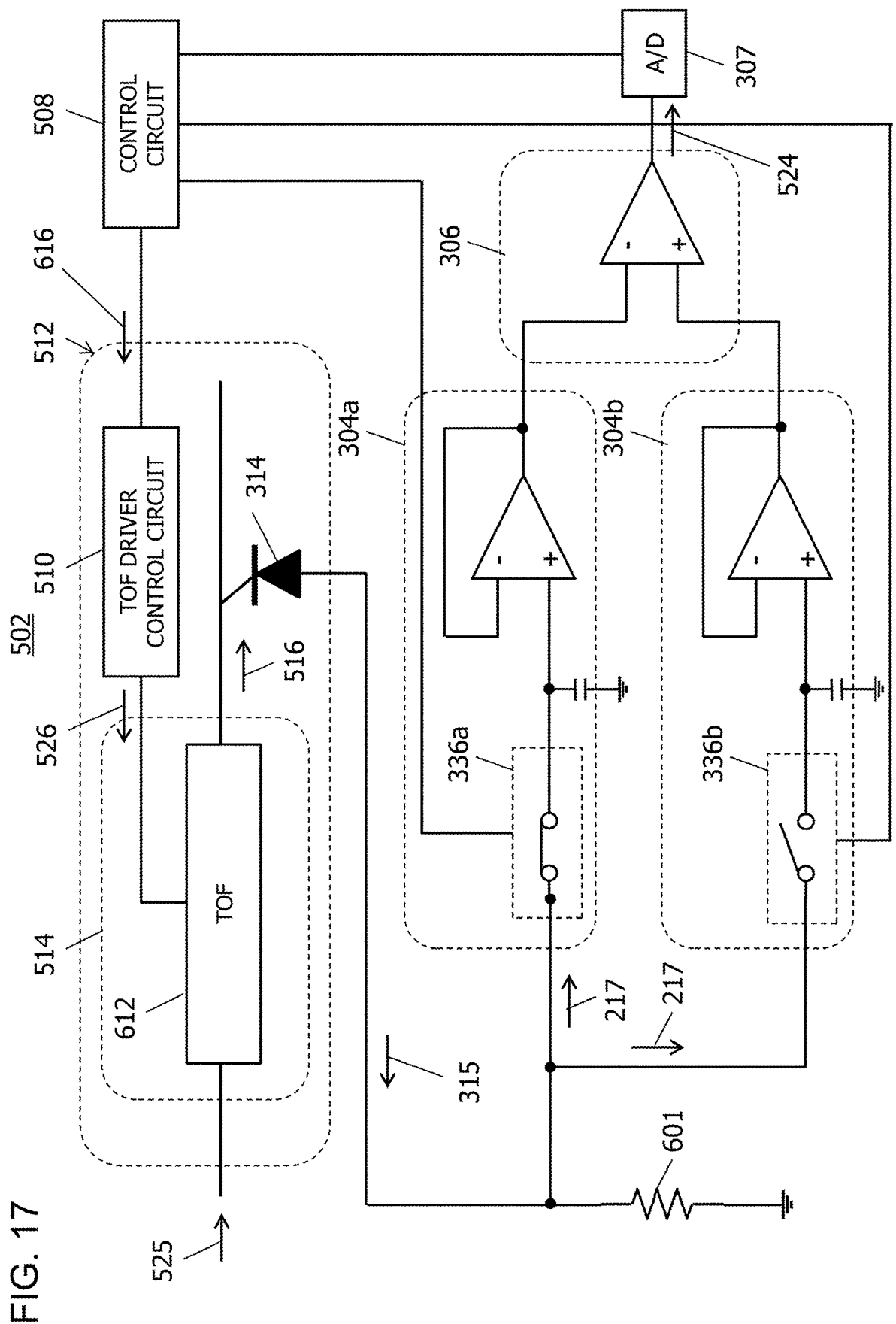
FIG. 17 is a diagram illustrating the operation of the controller 502.

FIG. 17 is a diagram illustrating the operation of the controller 502. The device 512 (the device controlled by the controller 502) includes a tunable optical filter (TOF) 612 and a TOF driver control circuit 510. The device 512 also includes a photodetector 314.

The photodetector 314 photoelectrically converts the light split from the output 516 of the TOF 612 to generate a photocurrent 315. The photocurrent 315 is inputted to the resistor 601 to generate a monitor signal 217, which is a voltage generated in the resistor 601 by the photocurrent 315.

The TOF 612 may include a diffraction grating that disperses the light 525 inputted to the TOF 612 (hereinafter referred to as input light), and a slit plate. The input light 525 dispersed by the diffraction grating is applied to the slit plate, and a part of the dispersed input light 525 passes through a slit in the slit plate. Light passing through the slit is outputted from the TOF 612, the light being a part of the input light 525.

The position of the slit plate determines the center wavelength of the light outputted from the TOF 612 (e.g., the center of the 3-dB bandwidth). The position of the slit plate changes according to the control voltage 526 (i.e., the bias) outputted from the TOF driver control circuit 510.

When the wavelength of the input light 525 received by the TOF 612 is constant, the intensity of the output 516 from a region 514 including the TOF 612 changes according to the position of the slit plate. The slit plate is a part of the TOF 612 and serves as the first portion 18*a* described with reference to FIG. 1. The state of the slit plate is a state quantified by the position of the slit plate (e.g., the distance from a reference position).

Figure 18:
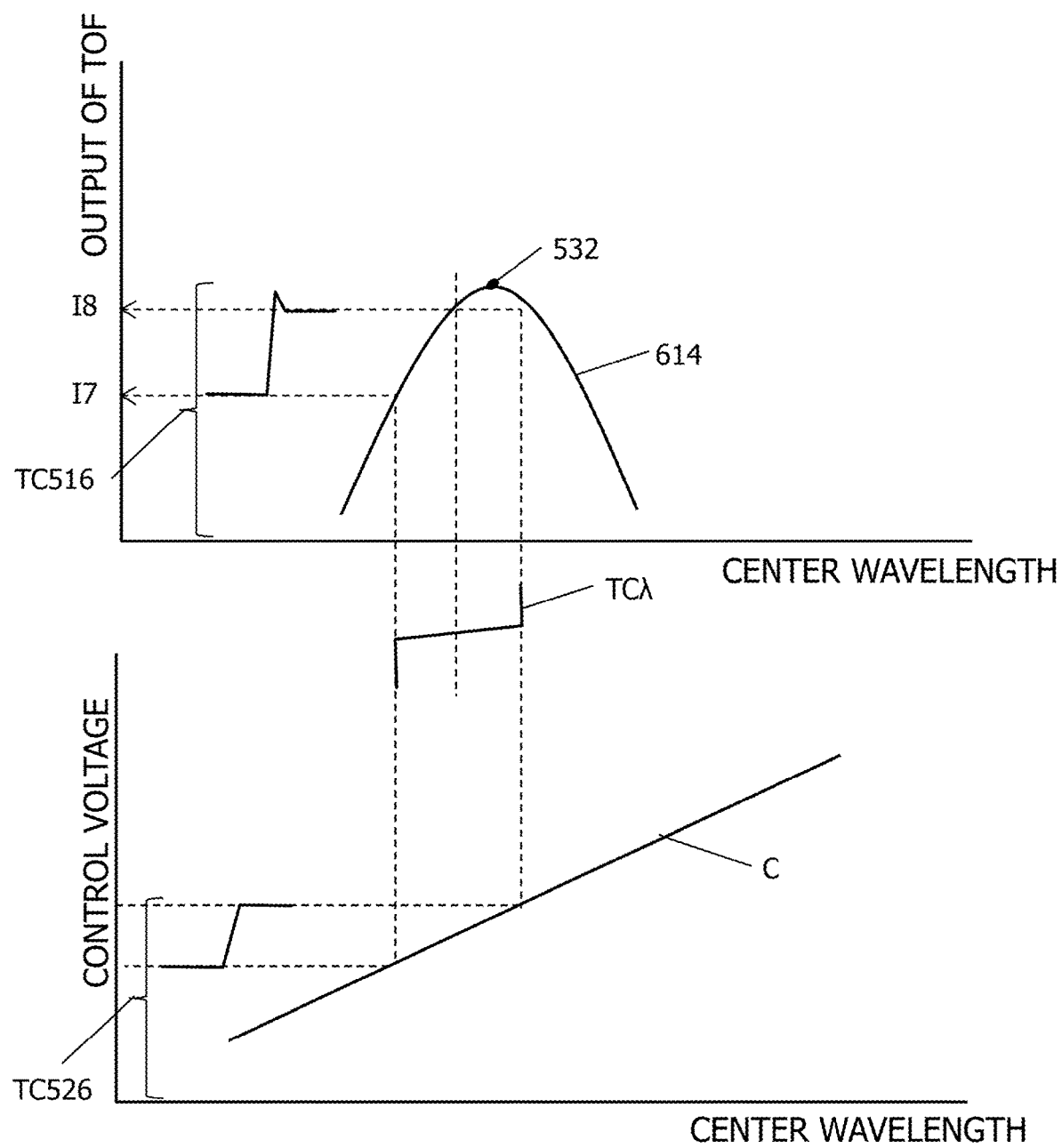
FIG. 18 is a diagram illustrating the operation of the control unit 210.

FIG. 18 is a diagram illustrating the operation of the control unit 210 (see FIG. 8).

The representation in the upper side of FIG. 18 (hereinafter referred to as the upper representation) illustrates the relationship 614 between the output 516 of the TOF 612 and the center wavelength. The vertical axis represents the intensity of the output 516 of the TOF 612. The horizontal axis represents the center wavelength of the output 516.

The representation in the lower side of FIG. 18 (hereinafter referred to as the lower representation) illustrates the relationship C between the control voltage 526 outputted by the TOF driver control circuit 510 and the center wavelength of the output 516. The vertical axis represents the control voltage 526. The horizontal axis represents the center wavelength of the output 516. The lower representation also illustrates the temporal change TC526 of the control voltage 526. The temporal change TCA of the center wavelength is illustrated between the upper and lower representations. The upper representation illustrates the temporal change TC516 of the output 516 of the TOF 612.

As indicated by the relationship 614 in the upper representation, the output 516 of the TOF 612 increases with the center wavelength, reaches the maximum value, and then decreases. The control circuit 508 controls the position of the slit plate of the TOF 612 via the TOF driver control circuit 510 so that the output 516 of the TOF 612 becomes the maximum value 532. That is, the target value of the output 516 is the maximum value.

Specifically, the control circuit 508 first transmits a command 616 to the TOF driver control circuit 510. In response to the command 616, the TOF driver control circuit 510 generates a control voltage 526 on which a square wave is superimposed (the temporal change TC526) and applies the control voltage 526 to the TOF 612.

The output 516 of the TOF 612 changes according to the control voltage 526. The control circuit 508 controls the TOF driver control circuit 510 so that the absolute value of the output 524 of the differential amplifier 306 is reduced, the output 524 resulting from the change in the output 516 (the temporal change TC516). This control allows the average value (=(I7+I8)/2) of the output 516 of the TOF 612 to approach the maximum value of the output 516 (i.e., the target value). This control is repeated, so that the intensity of the output 516 of the TOF 612 eventually becomes approximately equal to the maximum value 533.

The third embodiment allows the output of the controlled region 514 to be maximized.

The first to third embodiments described above are examples and are not restrictive. The core of the Mach-Zehnder modulator of the first and second embodiments is made of silicon. However, the cores of the Mach-Zehnder modulator of the first and second embodiments may be made of a material other than silicon. For instance, the cores of the Mach-Zehnder modulator of the first and second embodiments may be made of InP or a ferroelectric material.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A controller for controlling a device in which an output from a region thereof including a first portion changes according to a first state of the first portion, the controller comprising:

a first hold unit that performs first sample-and-hold processing that includes changing a first output thereof according to an intensity of a monitor signal inputted thereto and thereafter holding the changed first output, the monitor signal changing according to the output;

a second hold unit that performs second sample-and-hold processing that includes changing a second output thereof according to an intensity of the monitor signal inputted thereto and thereafter holding the changed second output, the second hold unit differing from the first hold unit; and a control unit that causes the first hold unit to perform the first sample-and-hold processing while holding the first state of the first portion constant and alters the first state of the first portion after the first sample-and-hold processing, then causes the second hold unit to perform the second sample-and-hold processing while holding the altered first state of the first portion, and furthermore controls the first state of the first portion based on a difference, between a first intensity of the first output held by the first hold unit and a second intensity of the second output held by the second hold unit, obtained by subtracting one of the first and second intensities from another thereof.

2. The controller according to claim 1, wherein the control unit repeats processing thereof so that an average value for an intensity of the output before the altering and an intensity of the output after the altering approaches a target value for an intensity of the output.

3. The controller according to claim 1, wherein
the region includes a second portion that differs from the first portion,
the output from the region further changes according to a state of the second portion,
the altering is processing in which the control unit alters a second state of the second portion together with the first state of the first portion so that a change in the output between before and after the altering of the first state of the first portion is magnified, and
the control unit controls the first state of the first portion and the second state of the second portion based on the difference.

4. The controller according to claim 3, wherein the region of the device includes:
a splitter configured to split inputted light into a first split light and a second split light;
a first optical waveguide configured to modulate a phase of the first split light;
a second optical waveguide configured to modulate a phase of the second split light; and
a combiner configured to combine the modulated first split light and the modulated second split light and output from the region light generated by the combining, wherein
the first portion includes a heater configured to heat the first optical waveguide, and
the second portion includes a heater configured to heat the second optical waveguide.

5. A method for controlling a device in which an output from a region thereof including a first portion changes according to a first state of the first portion, the method comprising:
generating a first signal that changes according to an intensity of the output while holding the first state of the first portion constant, and then holding the generated first signal;
thereafter, altering the first state of the first portion;
generating a second signal that changes according to an intensity of the output while holding the altered first state of the first portion constant, and then holding the generated second signal; and
controlling the first state of the first portion based on a difference, between a first intensity of the held first signal and a second intensity of the held second signal, obtained by subtracting one of the first and second intensities from another thereof.

* * * * *